US007393280B2

(12) United States Patent
Cannon

(10) Patent No.: US 7,393,280 B2

(45) Date of Patent: Jul. 1, 2008

(54) CLASS OF FEATURE EVENT GAMES SUITABLE FOR LINKING TO MULTIPLE GAMING MACHINES

(75) Inventor: Lee E. Cannon, Bozeman, MT (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/932,741

(22) Filed: Aug. 17, 2001

(65) Prior Publication Data

US 2003/0036430 A1 Feb. 20, 2003

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................ 463/42; 463/16; 463/17; 463/18; 463/19; 463/20; 463/40; 273/138.1; 273/139

(58) Field of Classification Search ................ 463/1-9, 463/25, 42, 16-20, 40; 273/45 A, 138.1, 273/139

See application file for complete search history.

(56) References Cited

U.S. PATENT DOCUMENTS

| | | | | | |
|---|---|---|---|---|---|
| 3,618,952 | A | * | 11/1971 | Tallarida | 273/269 |
| 4,760,527 | A | | 7/1988 | Sidley | |
| 4,856,787 | A | | 8/1989 | Itkis | |
| 4,926,327 | A | | 5/1990 | Sidley | |
| 5,393,057 | A | * | 2/1995 | Marnell, II | 463/13 |
| 5,482,289 | A | * | 1/1996 | Weingardt | 273/269 |
| 5,664,998 | A | | 9/1997 | Seelig et al. | |
| 5,772,509 | A | | 6/1998 | Weiss | |
| 5,851,148 | A | * | 12/1998 | Brune et al. | 463/25 |
| 5,938,200 | A | * | 8/1999 | Markowicz et al. | 273/246 |
| 5,947,820 | A | | 9/1999 | Morro et al. | |
| 5,980,384 | A | | 11/1999 | Barrie | |
| 6,012,982 | A | * | 1/2000 | Piechowiak et al. | 463/16 |
| 6,059,658 | A | | 5/2000 | Mangano et al. | |
| 6,120,377 | A | | 9/2000 | McGinnis, Sr. et al. | |
| 6,135,884 | A | | 10/2000 | Hedrick et al. | |
| 6,142,872 | A | * | 11/2000 | Walker et al. | 463/16 |

(Continued)

OTHER PUBLICATIONS

"Pathfinder" The Price is Right. 1988. [online] [retrieved on Oct. 16, 2003] Retrieved from the Internet at <URL:http//gscentral.net/path.htm>.*

*Primary Examiner*—Robert E Pezzuto
*Assistant Examiner*—Meagan Thomasson
(74) *Attorney, Agent, or Firm*—Bell, Boyd & Lloyd LLP

(57) ABSTRACT

A gaming method, apparatus and system for playing a game of chance is disclosed in which a plurality of gaming machines may be linked together for mutually competitive play. According to one embodiment, two or more gaming machines are linked to a centrally located display exhibiting a game board comprising one or more groups of earmarkable cells in one or more groups. Players on the gaming machines wager and attempt to achieve winning outcomes which earmark cells in the group with designators of their respective gaming machines. When a predetermined number or configuration of cells of a group are earmarked, an award may be distributed to those gaming machines having earmarked cells according to the number of designators within that group associated with each gaming machine. The game of chance may be configured for play on an individual gaming machine.

34 Claims, 16 Drawing Sheets

U.S. PATENT DOCUMENTS 6,203,430 B1 3/2001 Walker et al.
6,206,782 B1 * 3/2001 Walker et al. ................. 463/25
6,210,275 B1 4/2001 Olsen
6,312,332 B1 * 11/2001 Walker et al. ................. 463/23
6,361,441 B1 * 3/2002 Walker et al. ................. 463/42
6,364,765 B1 * 4/2002 Walker et al. ................. 463/16
6,398,643 B1 * 6/2002 Knowles et al. ............... 463/17
6,398,645 B1 * 6/2002 Yoseloff ...................... 463/19
6,416,408 B2 * 7/2002 Tracy et al. ................... 463/16
6,461,241 B1 10/2002 Webb et al.
6,503,146 B2 * 1/2003 Walker et al. ................. 463/25
6,648,754 B2 * 11/2003 Baerlocher et al. ............ 463/17
6,692,353 B2 * 2/2004 Walker et al. ................. 463/16
6,733,390 B2 * 5/2004 Walker et al. ................. 463/23

* cited by examiner

CLASS OF FEATURE EVENT GAMES SUITABLE FOR LINKING TO MULTIPLE GAMING MACHINES

BACKGROUND

1. Field of the Invention

The present invention relates to apparatus, systems and methods for conducting games of chance and, in particular, apparatus, systems and methods involving gaming machines which may be linked together for competitive play in a feature event.

2. State of the Art

Various electronic gaming systems and their associated apparatus and methods of use are well-known in the art. Examples of several patents describing games of chance include U.S. Pat. No. 5,947,820 to Morro et al. (slot machine-puzzle game combination), U.S. Pat. No. 5,833,536 to Davids et al. (electronic card games), U.S. Pat. No. 5,820,460 to Fulton (video poker game), U.S. Pat. No. 5,769,716 to Saffari et al. ("falling symbol" game), U.S. Pat. No. 5,351,970 to Fioretti ("Methods and Apparatus for Playing Bingo Over a Wide Geographic Area"), U.S. Pat. No. 5,333,868 to Goldfarb ("Method of Playing a Game of Chance at Locations Remote from the Game Site"), and U.S. Pat. No. 4,856,787 to Itkis ("Concurrent Game Network"), the disclosures of each of which patents are incorporated herein by reference.

Gaming establishments continually search for new games to pique players' interest so as to encourage the players to spend more time wagering. Players losing interest in a gaming machine will cease play, which often times causes the gaming machine to go idle and to fail to contribute to the revenue stream to the casino. Furthermore, interested players may tend to be more active and consistent in the play of their respective machines and consequently tend to play faster, thus enhancing the potential profit of the machine. One strategy for stimulating player interest includes offering the potential for larger or more frequent payoff awards. A second proven strategy involves the introduction of new games of chance designed to entice players by appealing to their sense of novelty. A third strategy is to foster a casino patron's sense of competition by offering games in which the players compete against and/or team with other players. Games of chance which combine the above-identified strategies, however, are lacking in the art.

In an attempt to maintain a player's interest by increasing the size of potential payoffs and through quasi-competition, progressive jackpots are commonly utilized by casinos. Progressive jackpots usually involve a number of electronically linked-together gaming machines, with players at those gaming machines competing to win a relatively large progressive jackpot in addition to nonjackpot winnings at each individual gaming machine. The progressive jackpot prize is typically determined by allocating a portion of the money wagered at each individual linked gaming machine to the progressive jackpot prize sum. Thus, the progressive jackpot value continues to increase until a player hits the progressive jackpot prize at one of the linked machines. Players at a casino are usually made aware of a progressive jackpot by its posting on a large screen, typically centrally located in relation to the electronically linked-together machines. Once the progressive jackpot prize is awarded to a player, a relatively rare event, the progressive jackpot prize amount is reset, typically to a predefined initial progressive jackpot prize value. The large awards offered by progressive jackpots are attractive to many players, and some progressive jackpots may reach into the millions of dollars.

While experiencing a certain degree of success, gaming machines linked together in competition for progressive jackpot prizes are hard pressed to maintain a player's interest, largely due to the fact that the large progressive jackpot prize is typically awarded only infrequently. Furthermore, the rare event of a progressive jackpot award results in players on progressively linked gaming machines primarily focusing on play at their individual gaming machines, rather than on competition against each other. Thus, the degree of player competition in progressive gaming machine play is nominal at best.

Lottery-type games are another form of quasi-competition among players. In a typical lottery-type game, players enter the game by selecting or randomly receiving a predetermined number of game elements (e.g., numbers) in hopes of achieving a winning combination of game elements to be randomly selected by the sponsoring entity. Typically, all entries must be in by a specified time deadline, whereafter the game elements of the winning combination are randomly selected by the sponsoring entity in a linear fashion, that is to say one digit of the winning number or numbers at a time and in sequence.

Because of the linear selection process, however, most of the players in the lottery-type game are rapidly excluded from winning large prizes during the initial selection of the winning game elements. Furthermore, there is typically a substantial lag time in lottery-type games between the entry of a player and identification of the winning combination as selected by the sponsoring entity. Thus, players in a lottery-type game only actively and briefly participate in the game during the purchase of an entry and subsequently during the selection process. Finally, the perceived level of competition, if any, between players is nominal and players typically do not even have to be present at the selection of the winning elements to win.

A further casino technique for maintaining a player's interest in a game of chance is through the sponsorship of tournament gaming events. To engage in tournament play, a player typically pays an entry fee, is awarded an initial number of credits, and plays continuously over a predetermined time period. At the end of the time period, awards are given to the players having earned, for example, the most wins and/or credits relative to their fellow tournament participants.

While tournament play fosters competition among players and provides for an extended period of time during which a player participates, tournament play may lack appeal to some players. First, only relatively few players taking part in a tournament will participate in any significant awards. Thus, some players who have achieved a substantial number of "wins" during tournament play may not receive any form of award, despite their perceptions of winning. Secondly, a player may not choose to enter a tournament because the available tournaments may only be scheduled at times inconvenient to the player, Furthermore, tournament play may take place over a protracted period of time, thus eliminating some participants who desire to play in a competitive environment, but who are unable to commit to the time required for a tournament session.

A still further method that has been used to motivate player interest involves the use of "racing games" wherein, for example, a bank of gaming machines is linked to several cars located on a centrally displayed "track." In a slot machine example of such a racing game, such as that disclosed in U.S. Pat. No. 5,664,998 to Seelig et al., the cars are linked to respective slot machines and move down the track a predetermined distance towards a finish line every time a special symbol appears on one of the machines' respective slot reels. Since the player whose car passes the finish line first is the winner, players are motivated to play at a faster rate in order to have more winning occurrences of the special symbol. The occurrences of the winning symbols, however, typically do not offer the player a chance for any type of award unless that player's car is the winner. Thus, a player whose race car is not advancing as quickly as others may become discouraged and lose motivation for faster play and/or to continue. Additionally, when the race ends, the player's investment in the game is lost, and the player may lose interest and seek out another game.

Thus, what is needed in the art are new gaming methods which both pique and maintain a player's interest through, for example, offering the potential for larger or more frequent payoff awards and appealing to a player's desire for competition by offering games in which the players may compete against other players, even while playing an individual game of chance on his or her gaming machine.

BRIEF SUMMARY OF THE INVENTION

In one aspect, the present invention is directed to a group gaming method. The method comprises receiving wagers from a plurality of players at respective gaming machines, and determining outcomes of individual games played by the plurality of players at the respective gaming machines. The method also comprises displaying an image representative of a group game played by the plurality of players at the respective gaming machines, wherein the group game includes taking a first plurality of steps toward a first group goal, wherein each step of the first plurality of steps is attributable to any of the respective gaming machines of the plurality of players. The method further comprises, for each outcome from a first set of outcomes, displaying an image representative of taking one step of the first plurality of steps towards the first group goal, wherein the image representative of taking the one step of the first plurality of steps towards the first group goal includes a designation indicative of the respective gaming machine at which the outcome from the first set of outcomes was determined. The method still further comprises providing a value payout associated with the group game based on the outcomes of the individual games played by the plurality of players at the respective gaming machines.

In another aspect, the present invention is directed to another group gaming method. The method includes receiving wagers from a plurality of players at respective gaming machines, and determining outcomes of individual games played by the plurality of players at the respective gaming machines. The method also includes displaying an image representative of a group game played by the plurality of players at the respective gaming machines, wherein the image representative of the group game comprises a first plurality of cells corresponding to a first group goal, wherein each cell of the first plurality of cells is attributable to any of the respective gaming machines of the plurality of players. The method additionally includes, for each outcome from a first set of outcomes, designating a cell of the first plurality of cells with a designation indicative of the respective gaming machine at which the outcome from the first set of outcomes was determined. The method further includes providing a value payout associated with the group game based on the outcomes of the individual games played by the plurality of players at the respective gaming machines.

In yet another aspect, the present invention is directed to a group gaming system. The group gaming system comprises a plurality of gaming machines. Each gaming machine of the plurality of gaming machines includes a gaming machine controller comprising a processor and a memory operatively coupled to the processor. The gaming machine controller is configured to receive a respective wager from a respective player, and display a respective image representative of a respective individual game played by the respective player. The gaming machine controller is also configured to determine a respective outcome of the respective individual game, the respective outcome of the respective individual game from a plurality of possible outcomes, and provide at least a portion of a value payout associated with a group game. The system additionally comprises a display device comprising a display screen operatively coupled to a display device processor. The display device processor is configured to display an image representative of the group game played by the players at the plurality of gaming machines, wherein the group game includes taking a first plurality of steps toward a first group goal, wherein each step of the first plurality of steps is attributable to any of the gaming machines of the respective players. The display device processor is also configured to, for each outcome of the individual games from a first set of outcomes, display an image representative of taking one step of the first plurality of steps towards the first group goal, wherein the image representative of taking the one step of the first plurality of steps towards the first group goal includes a designation indicative of the gaming machine at which the outcome from the first set of outcomes was determined.

In still another aspect, the present invention is directed to a method of facilitating play of a group game. The method includes, in each of a plurality of plays of individual games played by a plurality of players at respective gaming machines, generating an outcome for the individual game, the outcome being one of a plurality of outcomes including at least one specific outcome. The method additionally includes displaying at least one group of cells, each cell in said at least one group of cells capable of being designated with a designator in response to any player of the plurality of players achieving the at least one specific outcome, wherein the designator indicates the gaming machine at which the at least one specific outcome was generated. The method further includes designating a cell of said at least one group of cells with the designator responsive to each occurrence of said at least one specific outcome.

BRIEF DESCRIPTION OF THE SEVERAL VIEWS OF THE DRAWINGS

The foregoing and other advantages of the invention will become apparent upon reading the following description of the preferred embodiments and upon reference to the drawings in which.

DETAILED DESCRIPTION OF THE INVENTION

Figure 1:
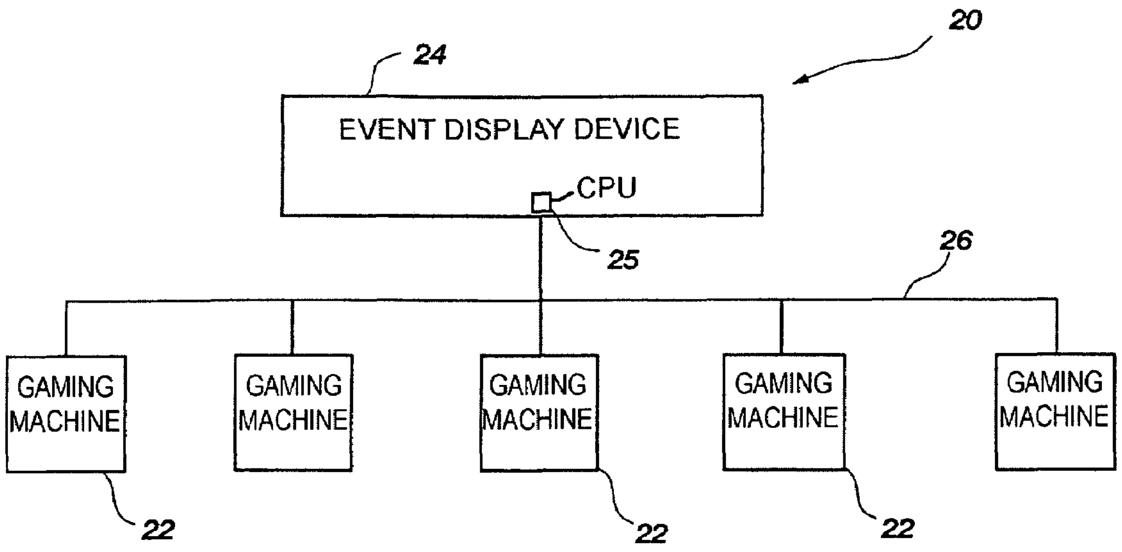
FIG. 1 is diagrammatic representation of a gaming system for use in the present invention.

A diagrammatic representation of an exemplary apparatus for use in an embodiment of the present invention is illustrated in drawing FIG. 1. Shown is a gaming system 20 comprising a bank of gaming machines 22 linked to an event display device 24 through communication links 26. By use of the terms "gaming system," "gaming machines" and "gaming" herein, it is meant that some form of wagering may be involved. Although five gaming machines 22 are shown in FIG. 1, it will be readily apparent to one of ordinary skill in the art that the present invention may incorporate any number of a plurality of gaming machines 22. Preferably, five or more gaming machines will be associated in the illustrated fashion, although numbers as low as two gaming machines may be used in the present invention. It is currently contemplated that about five to fifteen gaming machines 22 may be linked in the manner described for implementation of the present invention.

Event display device 24 may be a relatively large liquid crystal display (LCD) screen (i.e., relatively large in comparison to individual display screens of gaming machines 22), or a series or array of such screens, positioned in an area above the gaming machines 22 such that the screen(s) is/are visible to players at each gaming machine 22. Event display device 24 may comprise other types of display screens known in the art, including cathode ray tube (CRT) screens, plasma display screens, and/or screens based on light emitting diode (LED) technology. Event display device 24 may be a display screen configured for multiple uses and/or concurrent display of other casino-sponsored information. For example, event display device 24 may be used in association with a Sports Book venue of the casino during periods in which event display device 24 temporarily is not used for the purposes of the present invention.

Event display device 24 is further configured with, or associated with, a central processing unit (CPU) 25 configured and programmed for operation of at least one feature event game of chance. CPU 25 is further configured for receiving gaming data from gaming machines 22, for displaying gaming data on a display screen of event display device 24 and for selecting one or more winners during gaming play on gaming machines 22, as will be described in more detail below.

Figure 2:
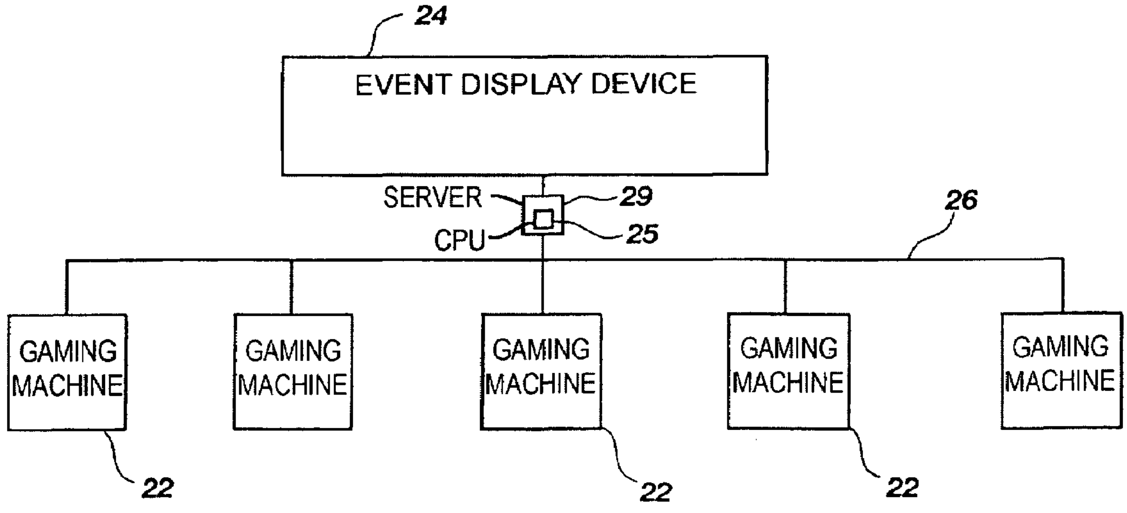
FIG. 2 shows another configuration of the gaming system illustrated in FIG. 1.

Thus, CPU 25 may be located within event display device 24 or be placed in an intermediary device linked to event display device 24. In one aspect of the embodiment shown in drawing FIG. 2, CPU 25 may be provided as a component of a server 29 that is linked to and communicates with a plurality of networked gaming machines 22 and/or event display device 24.

Communication links 26 may be any of a variety of communication links known in the art, including, but not limited to: twisted-pair wire, coaxial cable, fiber optic, Ethernet, bus line, Fibre Channel, ATM, standard serial connections, radio wave or other wireless connections, and the like. In this regard, gaming machines 22 may be connected to event display device 24 through communication links 26 configured to be in direct communication with event display device 24. Additionally, the connection between a gaming machine 22 and an event display device 24 may be effected through a LAN (e.g., Ethernet, token ring, etc.), WAN, intranet, an Internet connection, or a combination thereof.

Figure 3:
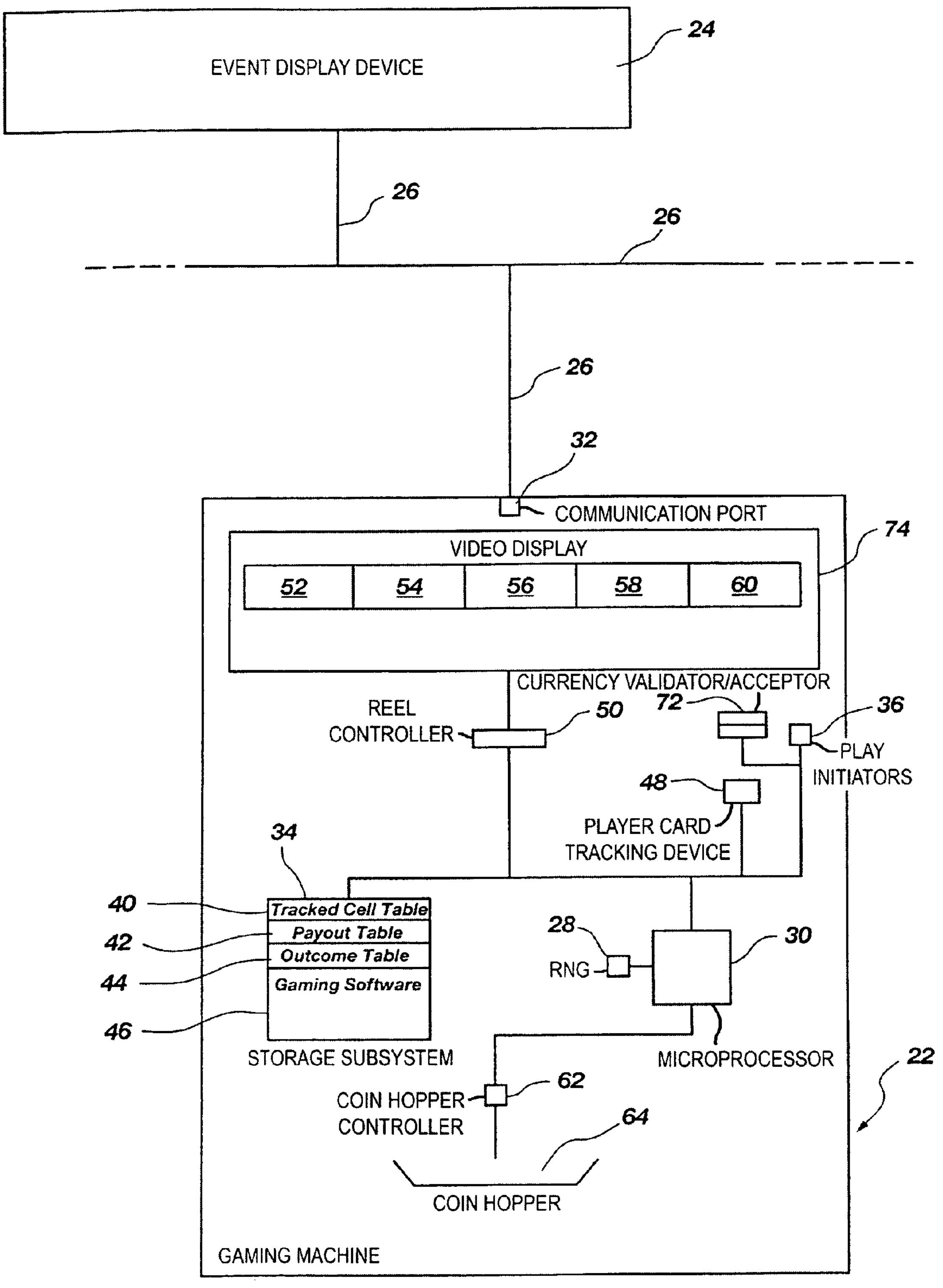
FIG. 3 is a simplified diagram of the architecture of an exemplary gaming machine for use in the present invention.

Referring now to FIG. 3, the architecture of an exemplary gaming machine 22 is illustrated. It should be noted, however, that the embodiment of the illustrated gaming machine 22 is for purposes of clarity in discussing the present invention herein, and is not intended to be limiting of the present invention in any manner.

In the nonlimiting example shown in FIG. 3, gaming machine 22 is configured as a reel-type slot machine including many conventional slot components. Gaming machine 22 is controlled by a microprocessor 30 and communicates with event display device 24 via communication port 32 and communication links 26. Microprocessor 30 is connected to a storage subsystem 34 which stores program instructions and data for operating gaming machine 22 in accordance with the present invention. For conducting games of chance, microprocessor 30 comprises, or is otherwise associated with, a random number generator 28 of a known type. Random number generator 28 is configured to randomly select game outcomes for games of chance, including specific game outcomes ("specific outcomes"). Use of the term "specific outcomes" herein refers to game outcomes which are winning outcomes (i.e., associated with a payout) or outcomes that provide a player a chance to win (i.e., provide a player a chance to win a payout).

Storage subsystem 34 comprises an appropriate combination of magnetic memory, such as hard disk memory and semiconductor memory such as random access memory (RAM) and read-only-memory (ROM), alone or in combination with optical memory such as CD-ROM. In addition to storing program instructions and data, storage subsystem 34 stores appropriate operating system and control software (not shown) functional to operate gaming machines 22 in a manner described below.

Storage subsystem 34 of gaming machine 22 may store a tracked cell table 40, a payout table 42, an outcome table 44 and gaming software application 46 consistent with the principles of the present invention as described below. Tracked cell table 40 tracks specific outcomes on event display device 24 for all gaming machines 22, payout table 42 defines payouts associated with possible specific outcomes, and outcome table 44 stores each outcome resulting from a session of play on gaming machine 22. Gaming software application 46 preferably includes instructions and commands for conducting a game of chance according to the present invention, as well as instructions and commands for implementing possible bonus payouts.

Further connected to microprocessor 30 are play initiators 36 (for activating gaming machine 22 in response to a wager), a player card tracking device 48, a reel controller 50 for controlling slot reels 52, 54, 56, 58, and 60, a coin hopper controller 62 having an associated coin hopper 64 for paying winning payouts, a currency validator/acceptor 72 for accepting currency on gaming machine 22, a video display 74 for displaying one or more games of chance, and (optionally) a tracked cell meter (not shown) for tracking play results concurrently with game results displayed on event display device 24. Further details of the various components of gaming machine 22 are revealed in the description to follow below.

Referring again to FIGS. 1 and 2, the above-described exemplary apparatus may be used in accordance with the principles of the present invention for the conduct of one or more differing "feature event games of chance." A "feature event game of chance," as used herein, is defined as a competitive game in which both the final game results and interim game results are displayed on event display device 24, and/or on each of the individual video displays 74 of participating gaming machines 22. Typically, a feature event game of chance is played by at least two participants ("players") on gaming machines 22 in proximity to event display device 24 and who may observe the interim and final game results by viewing the one or more screens of event display device 24.

Generally, a feature event game of chance comprises competitive play using games of chance on respective gaming machines 22 wherein players attempt to achieve winning outcomes ("specific outcomes") associated with a plurality of potential winning outcomes found under one or more award categories of a "game board" displayed on event display device 24. As used herein, a "game board" refers to a particular game configuration displayed on event display device 24 which requires multiple specific game outcomes for completion of play under an individual award category. Typically, each game board within a feature event game of chance is associated with a prize of a fixed or a variable amount comprising an "award category." A further defining element of a feature event game of chance is that there exists the potential for all participants in the feature event game of chance to "win" (i.e., receive an award) until such time as the feature event game of chance is over. To play a feature event game of chance, players on gaming machines 22 will typically wager to activate play and also engage in subsequent wagering to continue play during each feature event game of chance. In other contemplated embodiments, a single entry fee may be paid to play in each feature event game of chance. After each instance of wagering, or after paying a single entry in that aspect of the embodiment, play is conducted in a conventional manner, such as by the players activating game initiators such as "play" buttons, pulling slot machine handles, and the like.

In preferred embodiments of the present invention, aspects of which are described in more detail with respect to drawings FIGS. 4-8, specific game outcomes achieved during a feature event game of chance cause "cells," or "blocks" of one or more configurations of a game board displayed on event display device 24 to be earmarked or posted (i.e., associated or identified) to the gaming machine or machines on which a specific game outcome has been achieved and thus to the associated player or players achieving the particular specific game outcomes.

By earmarking a cell or block of an award category of a particular game board, it is meant that the players receive a visual indication on event display device 24 and/or gaming machines 22 that a particular player or players have achieved a winning outcome with respect to that cell. Thus, a cell or block of an award category comprises a defined area on event display device 24 and/or gaming machines 22 which can be visually attributable to one or more players.

When a given number (typically all, but the invention is not so limited) available cells of an award category configuration of a game board are earmarked, thus resulting in a winning game board, the feature event game of chance is completed and the awards found in the award category of the winning game board are distributed to the players in accordance with the visual indications of the earmarked cells and/or as described in detail below. After distribution of all awards, all game boards on event display device 24 may be reset and a new feature event game of chance may be played. Alternatively, only the winning game board may be reset and the game boards having less than all available cells earmarked at the time the winning game board is completed may be left in an uncompleted configuration for completion during further play.

Figure 4:
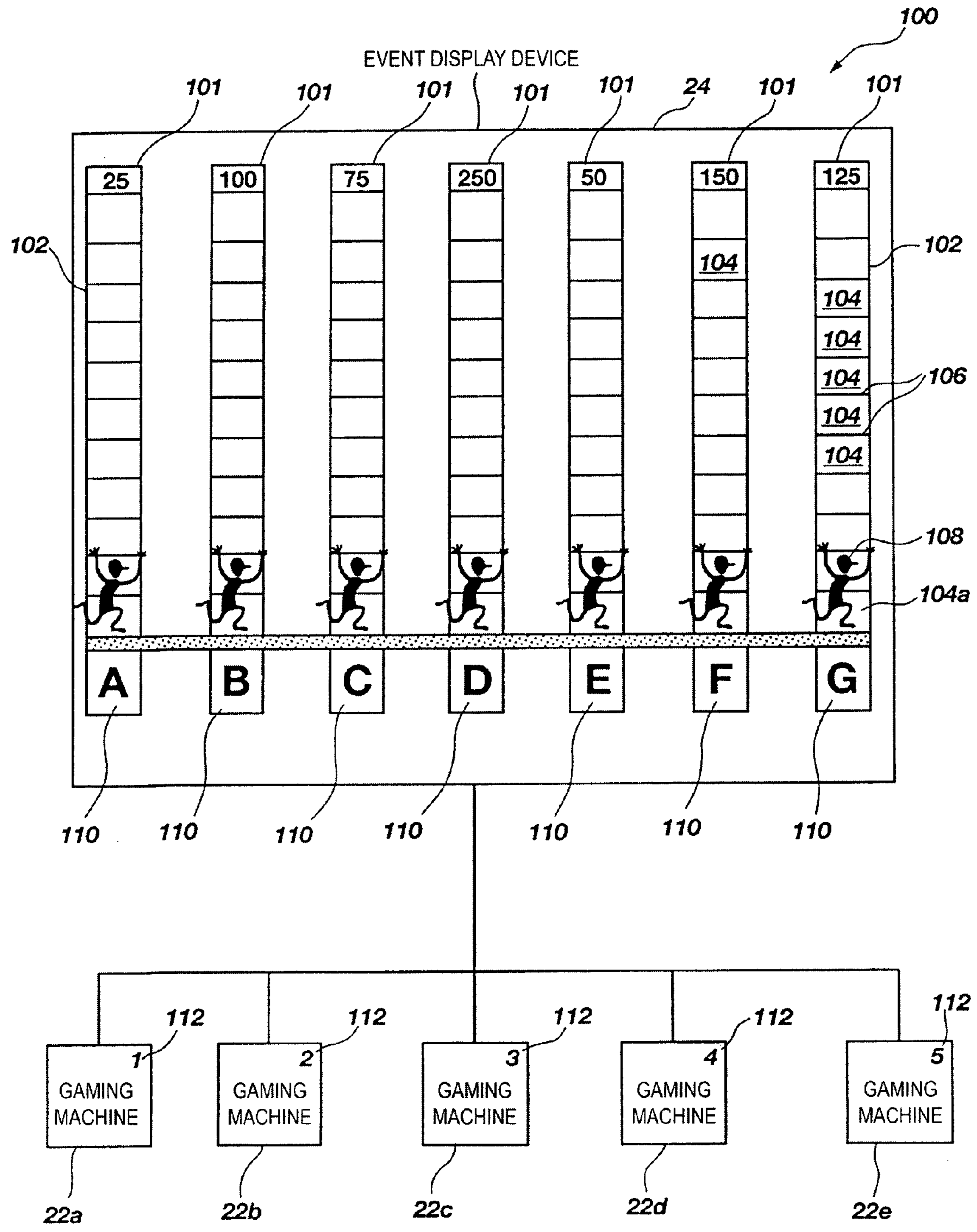
FIGS. 4 through 7 illustrate embodiments of a feature event game of chance according to the present invention.

Referring now to drawing FIG. 4, an exemplary feature event game of chance configuration ("feature event gaming configuration") 100 is illustrated. Each gaming machine 22 of a bank of five gaming machines 22*a*, 22*b*, 22*b*, 22*d* and 22*e* is shown electronically (such term including optical as well as wireless) linked to an event display device 24 in the manner previously described. Gaming machines 22*a*, 22*b*, 22*b*, 22*d* and 22*e* are each provided with a gaming machine designator 112, shown in FIG. 4 as a numeric label. For example, gaming machine 22*a* is provided with the identifying numeric label "1" as a gaming machine designator 112, while gaming machines 22*b*, 22*c*, 22*d* and 22*e* are provided with gaming machine designators 112 referenced by the numeric labels 2 through 5, respectively.

In the illustrated exemplary embodiment, the game boards are depicted as a plurality of rows configured as ladders 102. As shown, ladders 102 comprise ten cells 104 each. One skilled in the art will appreciate that while ten cells 104 are illustrated, the present invention is not limited to any particular number of cells. Each cell 104 of ladders 102 is configured with "rungs" 106, the rungs 106 defining the bottom-most and top-most portions of each cell 104. At the bottom of each ladder 102 is an image representative of an object, person, or animal, shown in FIG. 4 as an animated element 108, positioned at a rung 106 of a bottom-most cell 104*a*. At the top of each ladder 102 is posted an award category 101 having an award amount associated therewith. The award amount may be the same amount or different amounts for each for ladder 102. Each of ladders 102 are further associated with unique identifiers 110, shown on event display device 24 as capital letters A through G. For ease of discussion, ladders 102 will be referenced by their respective unique identifiers 110 when referred to individually.

As depicted in FIG. 4, event display device 24 shows seven award categories 101 located above ladders 102. For illustrative purposes only, ladders A through G are shown as configured with prizes in respective award categories 101 of $25, $100, $75, $250, $50, $150, and $125. The prize for each award category 101 represents the total amount of winnings available for completed play of a single feature event game of chance.

In other embodiments, the prize amounts for each award category 101 may be the same for some or all of ladders A through G, may differ for each of ladders A through G, or may vary more or less divergently than the exemplary embodiment shown herein. Furthermore, the prizes for completed play under each award category 101 may be of fixed values, randomly determined values (e.g., randomly set by the casino after each completed round of play), based upon a progressive (e.g., based on a percentage of all wagers placed at gaming machines 22), or be based upon a combination of specific game outcomes occurring during play of a feature event game of chance.

Gaming machines 22 are compatibly configured for play of the feature event gaming configuration 100 displayed on event display device 24. Thus, each of gaming machines 22 is configured with at least one game of chance having at least one possible outcome which will correspondingly earmark a cell 104 of a ladder 102 as a "specific outcome." The odds for achieving the at least one possible outcome for earmarking a cell 104 may be the same for all cells 104 of a given ladder 102 or be varied for some or all cells 104. Therefore, in one aspect of the embodiment, the odds of achieving the possible outcomes that would earmark the cells 104 found in ladder D (having $250 as the award category 101 prize) may be relatively higher than the odds of achieving the possible outcomes that would earmark the cells 104 found in ladder A (having $25 as the award category 101 prize). It is currently preferred, however, that the odds of activating all cells 104 of all ladders 102 be equal.

The games of chance configured on gaming machines 22 may be any of a variety of games of chance typically found at casinos, and thus include various reel-type slot machine games, poker games, blackjack games, keno games, lotto games, bingo games, and the like. For clarity in discussing the present embodiment, however, gaming machines 22 will be described as provided in a configuration suitable for playing a 5-reel multi-line slot machine game.

Figure 5:
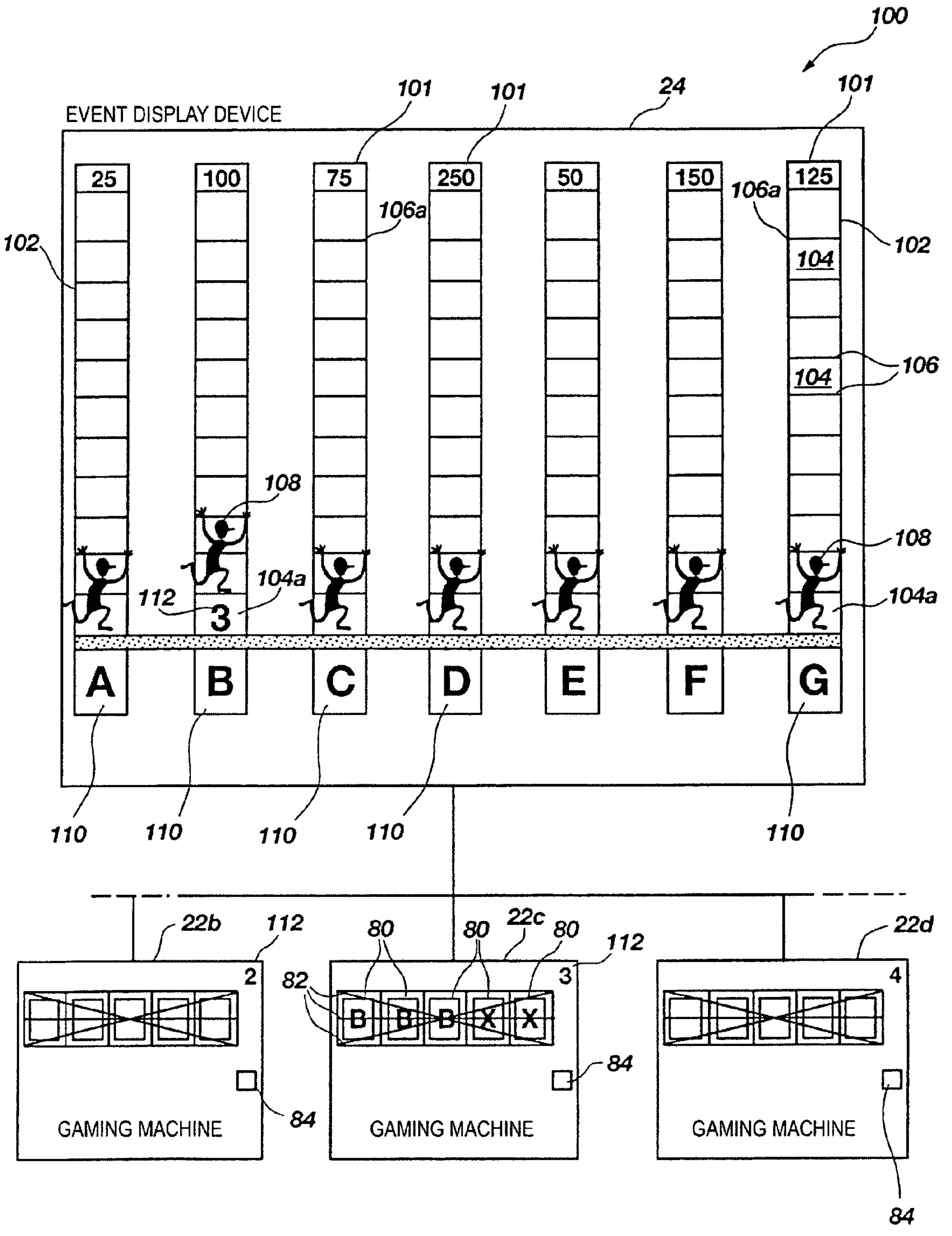

Referring now to FIG. 5, gaming machines 22 are configured with reels 80, paylines 82, and play buttons 84 for play of a 5-reel multiline slot machine game. The illustrated configuration of gaming machines 22 is not intended to be limiting of the present invention and, as previously described, gaming machines 22 may be provided in any of a number of configurations for the play of one or more of a variety of games of chance.

Competitive play on gaming machines 22 may, but not necessarily, begin at the same time for all gaming machines 22. In accordance with an embodiment of the present invention, a specific outcome on a gaming machine 22 causes a cell 104 of a ladder 102 to be visually assigned, that is to say earmarked or posted, to the particular gaming machine 22 that achieved the specific outcome. For example, the gaming machine designator 112 of the particular gaming machine 22 achieving the specific outcome may be posted in a cell 104 of a ladder 102. In the illustrated embodiment, the cells 104 of a ladder 102 are posted sequentially (e.g., in an upward manner) in association with gaming machine designators 112 upon specific outcomes achieved by respective gaming machines 22. Thus, the bottom-most cell 104*a* of a particular ladder 102 is posted first, with the posting of other cells 104 following upwardly, in order, on ladder 102 with the achievement of further specific outcomes.

The achievement of specific outcomes on gaming machines 22 also causes an animated element 108 to climb up one rung 106 of a ladder 102 in response to each respective specific outcome. As shown by drawing FIG. 5, the animated element 108 on the ladder 102 designated as "B" has climbed up one rung 106 in response to a specific outcome achieved by a gaming machine 22*c*. In accordance with the above-described embodiment, the first, or bottom-most, cell 104*a* is earmarked with the number "3," which corresponds to the gaming machine designator 112 of gaming machine 22*c*. Thus, this aspect of the embodiment in FIG. 5 illustrates the result of a single specific outcome wherein the specific outcome was achieved by gaming machine 22*c*.

According to the illustrated embodiment, each of gaming machines 22 is configured with a 5-reel multiline slot machine game wherein the slot machine reels 80 are provided with indicia representing the unique identifiers 110 of each ladder 102. For example, each gaming machine 22 is configured with reels 80 adapted to display one or more of unique identifiers 110 (i.e., A-G) in a payline 82 upon a particular, but randomly determined, outcome resulting from play of the reel slot machine game for which the gaming machine 22 is configured. A cell 104 is earmarked and an animated element 108 advances in the manner previously described upon a specific outcome of the reel slot machine game in which a predetermined number of unique identifiers 110 are displayed in a payline 82. As one nonlimiting example, such a specific outcome may comprise having three or more instances of a unique identifier 110 displayed in a payline 82.

As shown in FIG. 5, play on gaming machine 22*c* resulted in three instances of the indicia "B" being displayed in a horizontal payline 82 of gaming machine 22*c*. Accordingly, the cell 104*a* of ladder 102 associated with the unique identifier 110 of "B" is earmarked with the number "3," which corresponds to the gaming machine designator 112 of gaming machine 22*c*. Additionally, the animated element 108 on the ladder 102 identified as "B" has moved up one rung 106 from the position shown in FIG. 4.

Play continues on gaming machines 22 with the results displayed thereon and/or on event display device 24 until an animated element 108 on one of ladders 102 reaches a top-most rung 106*a*. At this time, awards are determined and distributed among each of those gaming machines 22 that triggered the upward progress of the animated element 108 on the "winning" ladder 102 by achieving one or more specific game outcomes and having a cell 104 earmarked or posted to that gaming machine 22.

Figure 6:
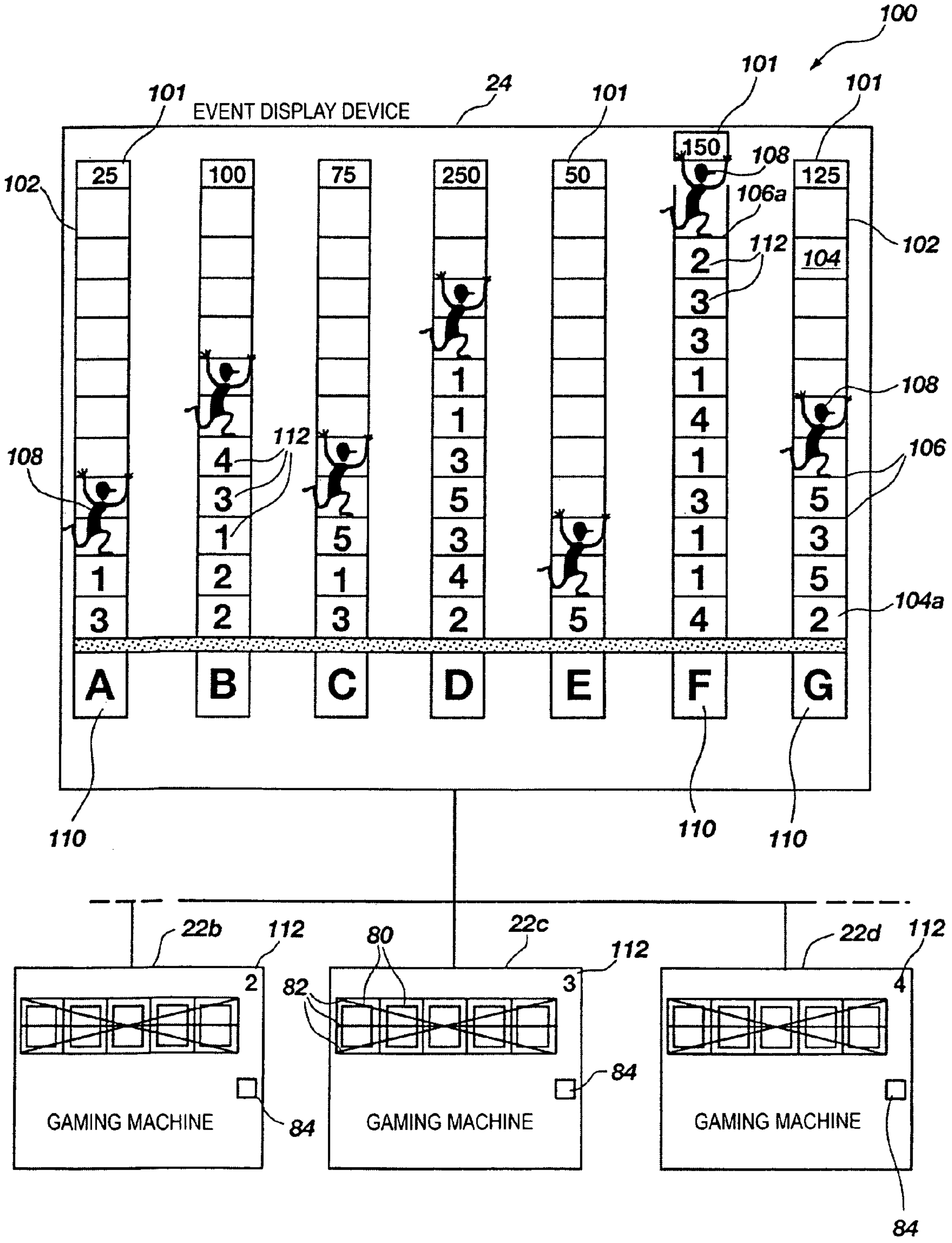

An example of completed play of a feature event game of chance on event display device 24 is illustrated in drawing FIG. 6. Therein, a ladder 102 associated with the unique identifier 110 "F" is shown with animated element 108 at a top-most rung 106*a*, and is thus identified as the winning ladder 102 ("winning ladder F"). At this time, play on gaming machines 22 and event display device 24 stops, and the total amount of winnings ($150) indicated for winning ladder F by award category 101 is distributed to the players in accordance with the number of gaming machine designations 112 for each gaming machine 22 posted in cells 104 of winning ladder F.

As illustrated in FIG. 6 (and with further reference to FIG. 4), gaming machine 22*a* (represented by the gaming machine designator 112 "1") has a posting in four cells 104 of winning ladder F, and thus would receive a proportionate amount (40%) of the total available winnings based on its four of ten possible postings. Gaming machine 22*b* (represented by the gaming machine designator 112 "2") posted only one cell 104, and thus would receive 10% of the total available winnings. Gaming machine 22*c* (represented by the gaming machine designator 112 "3") posted three cells 104, and thus would be awarded a 30% share. Gaming machine 22*d* (represented by the gaming machine designator 112 "4") posted two cells 104 and would be entitled to a 20% share, while gaming machine 22*e* posted no cells and would correspondingly receive none of the available award. A summary of the proportionate dollar amounts earned by each gaming machine 22*a-e* (represented by their gaming machine designators 112 "1-5") is shown in Table 1:

TABLE 1

| Gaming Machine | No. Cells Posted | Award Share Of $150 |
|---|---|---|
| 1 | 4 | $60 |
| 2 | 1 | $15 |
| 3 | 3 | $45 |
| 4 | 2 | $30 |
| 5 | 0 | $0 |
| Total | 10 | $150 |

After completed play of a feature event game of chance, event display device 24 and gaming machines 22 are preferably reset, thus clearing all prior gaming machine designators 112 from all cells 104 of all ladders 102. Optionally, at this time the prize amounts for each award category 101 may be modified or subject to redetermination, the odds of achieving a posting in a specific cells 104 may be changed, and players may choose to leave or join gaming machines 22. A new feature event game of chance will then typically be conducted according to the gaming principles as previously discussed.

Alternatively, after prize amounts have been ascertained, apportioned and distributed is association with completion of game play for a given winning ladder 102, play may continue on those ladders 102 which have yet not been completed as winning ladders and which may have some cells 104 earmarked.

Figure 7:
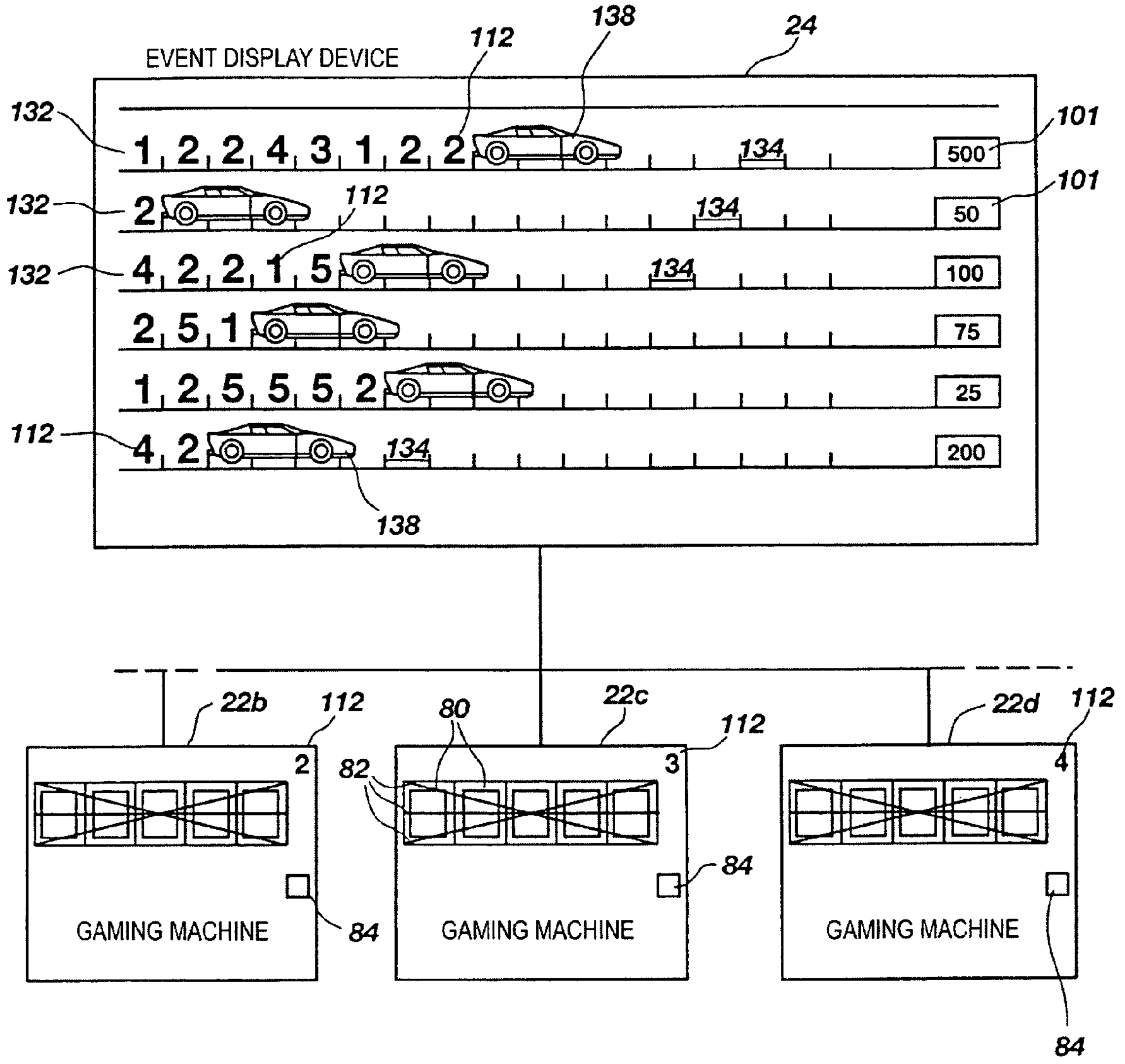

The subject embodiment readily tends itself to a number of other interesting game board configurations, as is illustrated in drawing FIG. 7. Therein, ladders 102 and cells 104 of FIGS. 4 through 6 are replaced with horizontal lanes 132 having cells 134, and animated elements 108 are replaced with racing cars 138. All other reference characters of FIG. 7 with like designations as shown in FIGS. 4 through 6 reference the same components as previously described. Again, each cell 134 is posted with gaming machine designators 112 associated with individual gaming machines 22 achieving the requisite specific game outcomes. As each cell 134 within a given horizontal lane 132 is posted with a gaming machine designator 112, the racing car 138 within that horizontal lane 132 advances. When all cells 134 within a particular horizontal lane 132 have been posted with gaming machine designators 112, the racing car 138 advances to the end of the horizontal lane 132 and has completed the "race." The prize associated with the award category 101 for that particular horizontal lane 132 is then distributed among the players according to the relative number of gaming machine designators 112 within cells 134 of that horizontal lane 132 associated with each gaming machine 22.

A second embodiment of a feature event game of chance is illustrated in drawing FIGS. 8 through 12. The second embodiment is similar to the embodiment and variations thereof disclosed with regard to drawing FIGS. 4 through 7, except that in the second embodiment, the cells of the displayed game board are not posted sequentially, but rather according to the particular specific outcomes on participating gaming machines.

Again, the feature event game of chance playable in the subject embodiment may be based on any of a variety of games of chance typically found at casinos, to include various slot machine games, poker games, blackjack games, keno games, lotto games, bingo games, and the like. For purposes of clarity and convenience in describing the present invention, the second embodiment is described in relation to competitive play on a series of gaming machines 122 configured as 5-reel spinning reel machines. Gaming machines 122 are linked to an event display device 124 in the manner previously described in relation to drawing FIGS. 1 and 2.

Figure 8:
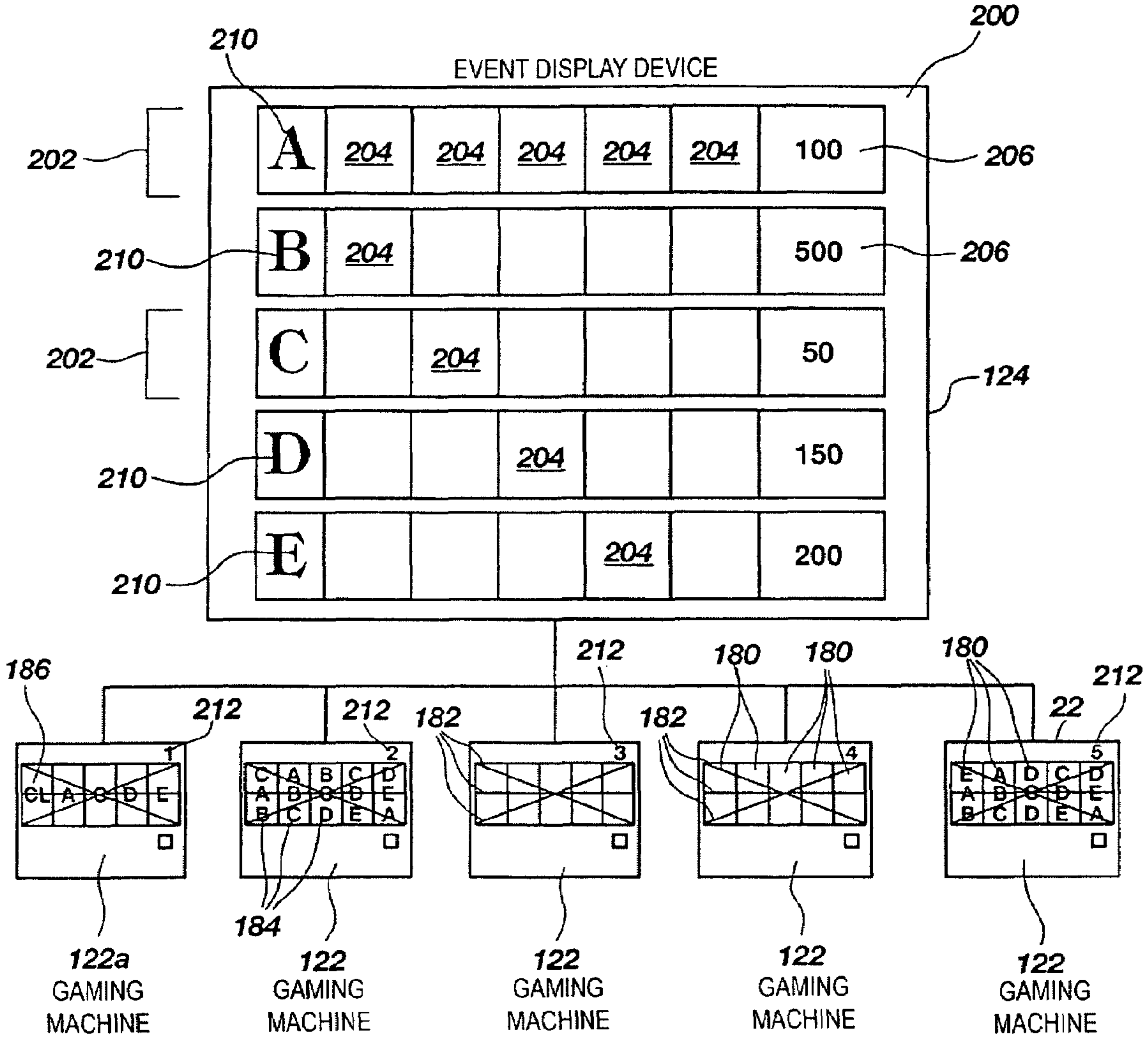
FIGS. 8 through 12 illustrate further embodiments of a feature event game of chance according to the present invention.

In FIG. 8, a blank feature event game board 200 is shown on an event display device 124 prior to play according to the present invention. In accordance with the subject embodiment, feature event game board 200 comprises five horizontal rows 202 with each row 202 provided with a unique identifier 210 "A" through "E," respectively. Of course, the rows 202 of the subject embodiment may be configured in any of a number of configurations, and not just horizontal, with the guiding principle being merely that players be able to readily track their mutual progress in each row 202. The rows 202 are configured with five cells 204 each, with each sequential cell 204 of each row 202 vertically aligned with a corresponding sequential cell 204 of the other rows 202. Although optionally not shown labeled as such, each sequential cell 204 of rows 202, taken left to right, respectively corresponds to one of the five reels 180 on 5-reel slot gaming machines 122, taken left to right. An award amount 206 is farther provided adjacent an end portion of each row 202. The award amount 206 may be the same or different for each of rows 202.

Each of gaming machines 122 are provided with five reels 180, one or more "paylines" 182, and a unique gaming machine designator 212. The unique gaming machine designators 212 are shown in FIG. 8 as reference numerals "1" through "5," respectively. Gaming machines 122 are further provided with a plurality of symbols 184 ("A" through "E") on each of the respective reels 180, the symbols 184 corresponding to respective unique identifiers 210 ("A" through "B") on rows 202. Each of reels 180 is further provided with at least one "FEATURE symbol" 186 thereon (as seen on gaming machine 122*a*), with each FEATURE symbol 186 corresponding to one of the five sequential cells 204 of each row 202. FEATURE symbol 186 may be any type of readily identifiable symbol or icon and is illustrated generically in FIG. 8 as a "casino logo" (represented by the letters "CL").

From a blank feature event game board 200, competitive play may begin at substantially the same time for all gaming machines 122 upon the input of sufficient wagers at the respective gaming machines 122. As currently more preferred, however, players may join in competitive play at gaming machines 122 at any time. In accordance with the principles of the present embodiment, cells 204 may be posted with a particular gaming machine designator 212 when a predetermined number (e.g., four) of the same symbols 184 and a FEATURE symbol 186 appear on a payline 182 of a gaming machine 122. Generally, achieving the predetermined number of a particular symbol 184 and a FEATURE symbol 186 results in the posting of a gaming machine designator 212 in an available cell 204 of a row 202 having a unique identifier 210 corresponding to the particular set of symbols 184. Furthermore, the particular cell 204 which is posted with the gaming machine designator 112 corresponds to the reel 180 displaying the particular FEATURE symbol 186.

Figure 9:
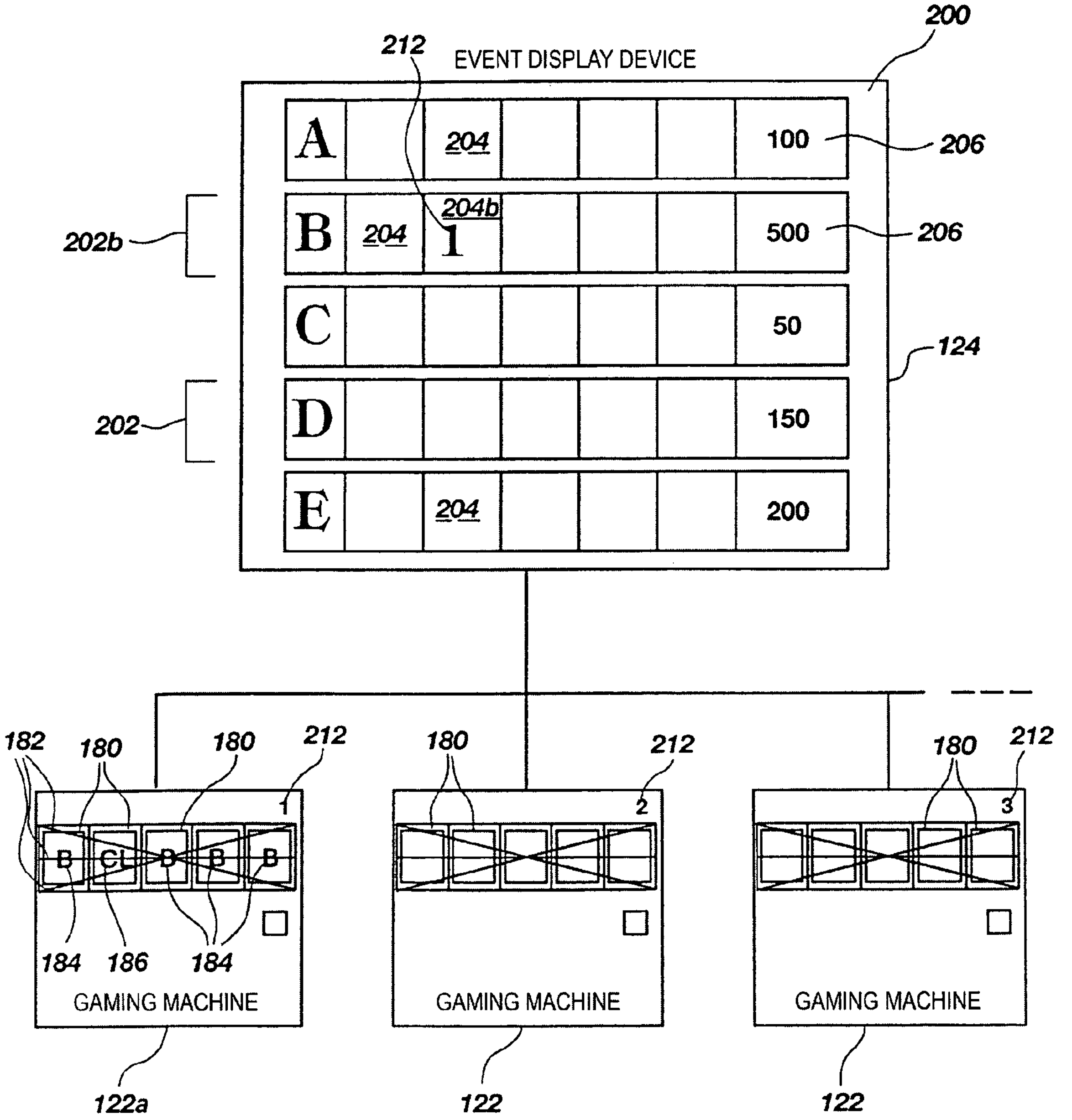

For example, drawing FIG. 9 illustrates the circumstance where play results in four of the same symbol 184 being respectively displayed on the first, third, fourth and fifth reels 180 in a payline 182 of a gaming machine 122*a* in conjunction with the display of a FEATURE symbol 186 on the second reel 180 of the payline 182. As shown in FIG. 9, a "1" has been posted in the second cell 204*b* of a row 202*b*. The particular row 202*b* receiving the posting corresponds to the particular designation ("A" through "F") of the four symbols 184 displayed on reels 180, while the posted "1" corresponds to the gaming machine designator 212 of the particular gaming machine 122*a* achieving the subject results. Accordingly, the achievement of four of the symbol 184 "B" on reels 180 of gaming machine 122*a* results in a posting of the gaming machine designator 212 "1" on the row 202*a* also having a "B" as unique identifier 210, Thus, feature event game board 200 in FIG. 9 shows the result of a single "win" by gaming machine 122*a* identified by a "1" as the gaming machine designator 212.

In accordance with the subject embodiment of a method of play, other cells 204 are posted with particular gaming machine designators 212 whenever a FEATURE symbol 186 appears on a reel 180 in conjunction with the predetermined number (e.g., four) of the same symbols 184 appearing on the other four reels 180 of a gaming machine 122. Play thus continues with players on gaming machines 122 competing for postings in cells 204 until all cells 204 within one of the rows 202 are posted.

Figure 10:
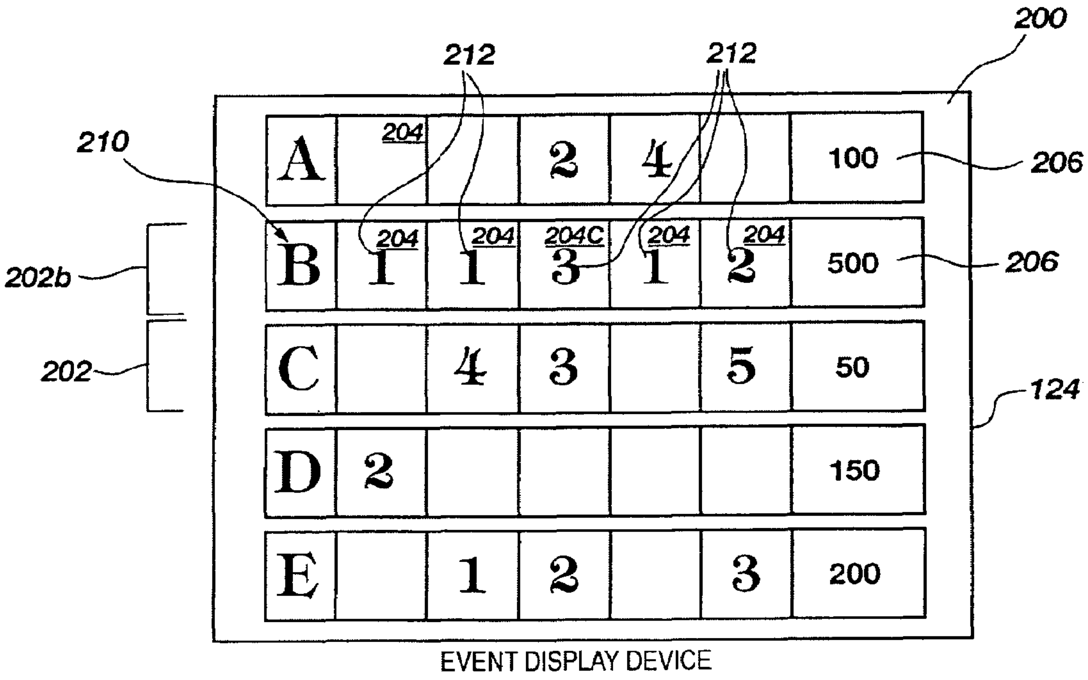

FIG. 10 illustrates an example of completed play on a feature event game board 200. As shown therein, all cells 204 of row 202*b* (provided with "B" as unique identifier 210) have been posted with gaming machine designators 212. According to the illustrated embodiment, the $500 prize (award amount 206) would be distributed in proportional amounts between players located at respective gaming machines 122 having "1", "3" and "5" as the gaming machine designators 212 which are posted in row 202*b* (see also FIG. 8). As shown, the player associated with the gaming machine 122 having a "1" as the gaming machine designator 212 would be entitled to 3/5ths of the $500 prize, while the players associated with the gaming machines 122 having "2" and "3" as the gaming machine designators 212 would be entitled to 1/5th of the $500 prize each.

Figure 11:
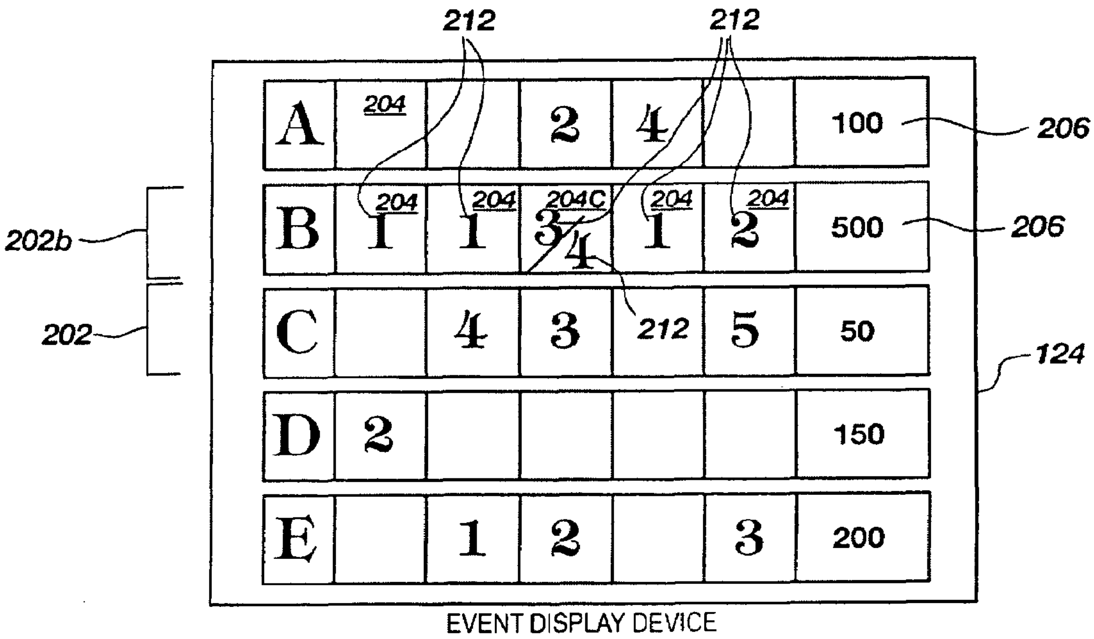

In one aspect of the embodiment, only a single posting or "win" is permitted per each cell 204. In a second aspect of the embodiment, a previously posted gaming machine designator 212 within a cell 204 may be replaced ("stolen away") with the posting of another gaming machine designator 212 within that cell 204. The replacement of a posting may occur, for example, upon the occurrence of one or more subsequently occurring specific outcomes associated with that cell 204. In a third aspect of the embodiment, multiple postings (e.g., two or more postings) are permitted per cell 204 as shown in drawing FIG. 11. In FIG. 11, the third cell 204*c* of "winning" row 202*b* is shown posted with both a "3" and a "4" as gaming machine designators 212, the two gaming machine designators 212 representing "wins" (specific outcomes) by two separate players in the same cell 204*c*. In this case, the players associated with the gaming machines 122 having "3" and "4" as the gaming machine designators 212 would be entitled to 1/10th of the $500 prize each (see FIG. 8).

In a further related embodiment, a single gaming machine 122 may be permitted to have multiple postings of its own respective gaming machine designator 212 within one or more single cells 204 of one or more rows 202. As shown in drawing FIG. 12, a cell 204*c* of a winning row 202*b* contains three postings of a "3" and one posting of a "4" as the gaming machine designators 212. As previously described, each posting represents a "win" on a gaming machine 122, with each win comprising a predetermined number of symbols 184 in conjunction with a FEATURE symbol 186 appearing in a reel position associated with cell 204*c*.

Figure 12:
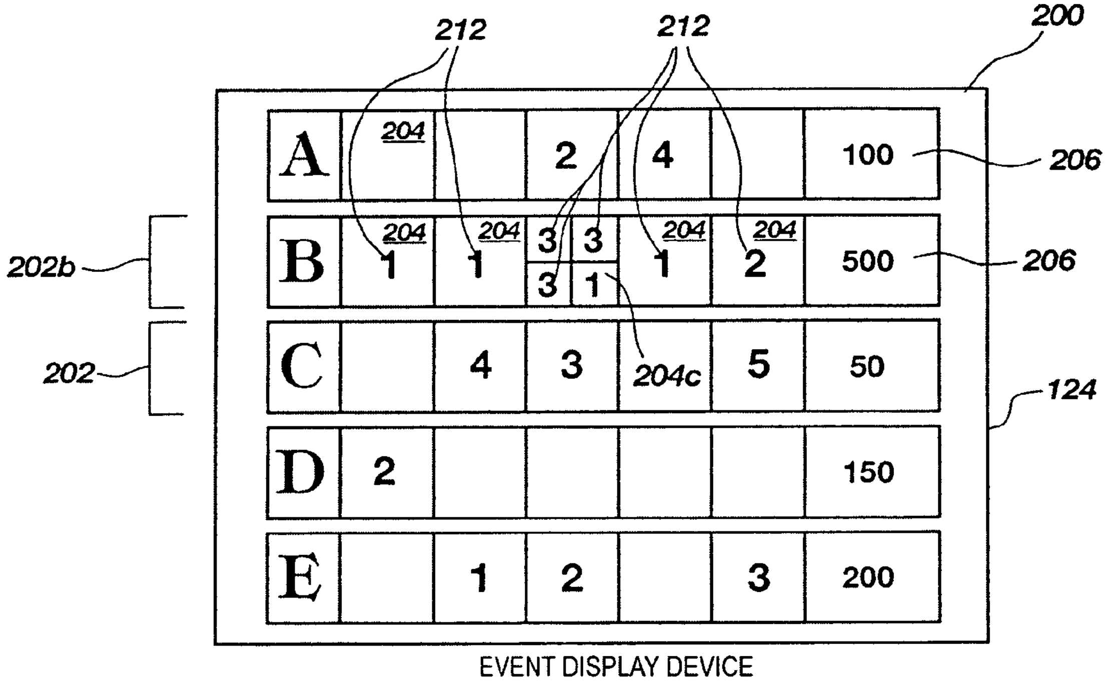

Still referring to FIG. 12, the prize amount for the postings in cell 204*c* may be calculated by dividing the prize entitlement for cell 204*c* in row 202*b* (1/5th of $500) by fourths (since there were four postings therein), with 3/4ths going to the gaming machine 122 having the gaming machine designator "3", and 1/4th going to the gaming machine 122 having the gaming machine designator 212 "1." Thus, the player at the gaming machine 122 having the gaming machine designator "1" would be entitled to a total distribution of $325 (for three nonshared postings in three cells 204 ($300) plus one shared posting in cell 204*c* (1/4th of $100). Since the gaming machine 122 having the gaming machine designator "3" only had postings that were shared in cell 204*c* the player at that gaming machine 122 would be entitled to a total distribution of $75 (3/4ths of $100).

Other variations of the subject embodiments will be readily apparent to one of ordinary skill in the art. For example, awards paid for a winning game board may be based on fixed values, a progressive value, a random value, total amounts wagered, and/or total cell hits. Additionally, awards may be: built upon specific game outcomes, adjusted for specific conditions (e.g, higher awards may be provided for a predetermined number of postings in cells of a row which are directly adjacent one another; awards may be paid only to those gaming machines having multiple postings (e.g., two or more) in a row), and/or based on the relative odds of achieving postings in a particular row. In yet another variation, a posting within a previously posted cell of a given row may simply increase the award for that particular row or on a feature event meter if one is employed (see FIG. 18). As yet a further implementation, posting to an already posted cell may result in an immediate, fixed award of, for example, a given number (i.e., ten) of credits in lieu of a posting to that cell.

As another example, the assignment of cells to gaming machines participating in a feature event game of chance according to the present invention: may be sequential (e.g., as previously described with regard to FIGS. 4 through 7); may be randomized in placement; may or may not allow multiple cell wins in a single game board outcome; may or may not be able to be subsequently lost or forfeited (such as by another participating gaming machine stealing the cell away); may or may not be assigned multiple times to the same or different gaming machines; and/or may or may not have equal weights relative to their share of the award (e.g., the final cell to be posted may provide the player that triggered the win with a higher relative percentage of an award than other cells within a feature event game board).

The present invention may also vary in options when a player leaves a participating gaming machine before a feature event game of chance is over. In this case, cells which have been posted to the gaming machine of the leaving player may be, for example: left in the subject gaming machine for the next player; left in the award pool for the next game session if there has not been play (no credits in the gaming machine) for a predetermined period of time; not paid if there has been no play (no credits in the gaming machine) for a predetermined period of time; awarded to another gaming machine (e.g., the gaming machine that posted the last available cell on a winning game board); or released (e.g., changed to unposted) during or after play if the gaming machine has not been used in play of the game of chance for a certain time period.

Figure 13:
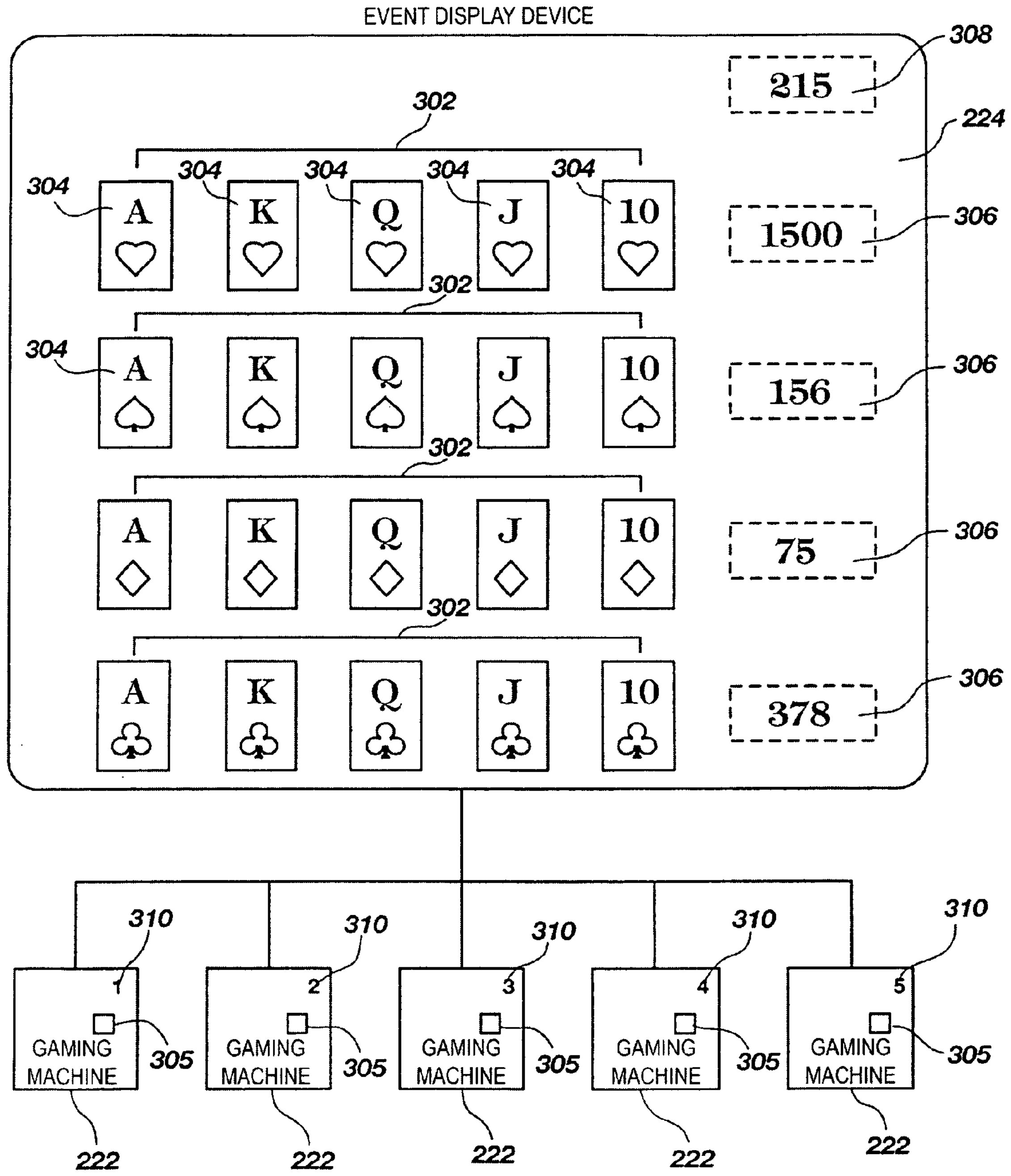
FIGS. 13 through 16 illustrate a draw poker embodiment of a feature event game of chance for competitive play by a plurality of players.

As previously discussed, a feature event game of chance according to the present invention may involve any of a variety of differing games of chance. In drawing FIG. 13, a video poker feature event gaming configuration 200 is provided. In this embodiment, a bank of gaming machines 222 is adapted for competitive play of a conventional game of video draw poker, but is otherwise substantially configured as previously described with regard to FIGS. 1-3. Gaming machines 222 are linked to an event display device 224 in a conventional manner. Incorporated by reference in respect of the subject embodiment are U.S. Pat. Nos. 4,760,527, and 4,926,327, both to Sidley, entitled "System For Interactively Playing Poker With A Plurality Of Players" (issued Jul. 26, 1988), and "Computerized Gaming System" (issued May 15, 1990), respectively. These patents describe an electronic system for playing a card game of poker which permits interactive wagering among a plurality of players. Gaming machines 222 may be configured and networked to enable players at gaming machines 222 to play against one another, or gaming machines 222 may be configured for play of individual poker games, as known in the art. Gaming machines 222 are also provided with designators 310 for competitive play of a game of chance according to the subject embodiment.

In a preferred aspect of the embodiment, four possible hands 302 of cards 304 are displayed in rows on event display device 224 and/or on a video screen of a gaming machine 222. Each hand 302 comprises a "Royal Flush" in a differing card suit. Thus, cards 304 include an Ace(A), King(K), Queen(Q), Jack(J), and a Ten (10) of a respective suit, the letters parenthetically indicated representing their associate card in FIGS. 13 through 18. Associated with each hand 302 is an award meter 306 displaying a cash award. The cash award displayed by each award meter 306 may be the same or different for each hand 302. As a nonlimiting example, award meters 306 will be described in relation to FIG. 13 as award meters having fixed prize amounts. Of course, award meters 306 may be configured as any of a variety of payout-providing award meters known in the art In a further aspect of the embodiment, a feature event meter 308 is provided over hands 302 on a upper portion of event display device 224 and/or a video screen of gaming machines 222. Feature event meter 308 also displays a cash award prize. In accordance with the subject embodiment, a plurality of gaming machines 222 linked to an event display device 224 compete to achieve specific outcomes which will collectively or individually earmark or post all of the cards 304 within a hand 302. Players on gaming machines 222 will typically wager to activate play and also engage in subsequent wagering to continue play. Alternatively, a single entry fee may be paid to play in each "competition" provided by the subject embodiment. After each instance of wagering (or after paying a single entry in that aspect of the embodiment), play is conducted in a conventional manner, such as by activating "play" and "hold card" buttons or other initiators 305 on gaming machines 222.

Figure 14:
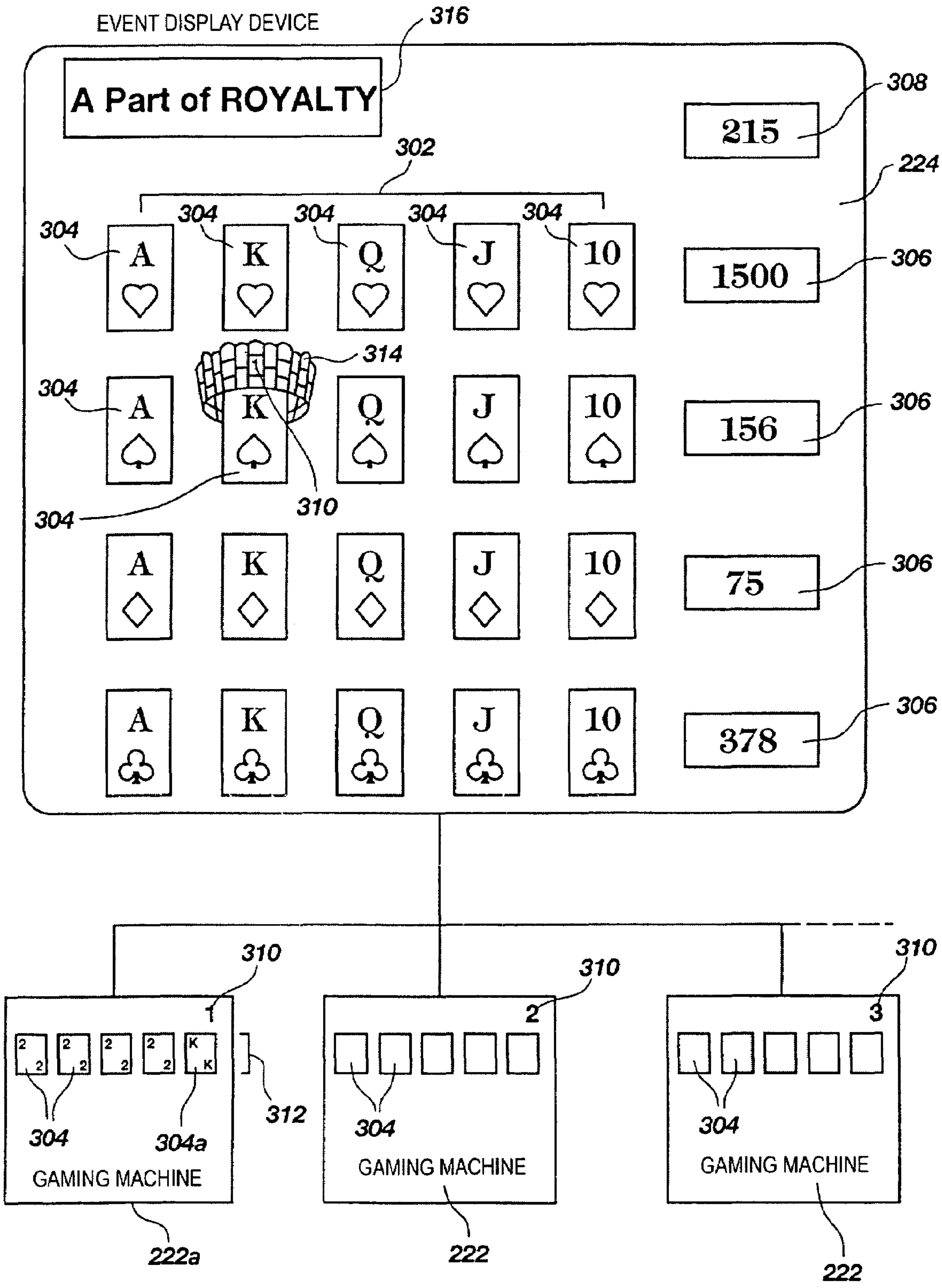

Preferably, the achievement of specific outcomes on gaming machines 222 will result in cards 304 being posted with designators 310 representing the gaming machines 222, as is shown in drawing FIG. 14. As was previously described in relation to FIGS. 4 through 7, designators 310 may comprise numbers, symbols, characters or any other type of unique identifier which can be associated with a particular gaming machine 222. Thus, a gaming machine 222 which achieves a specific outcome associated with a card 304 is visually identified (e.g., indicated by posting a designator 310) on a portion of the card in a manner viewable to players on other gaming machines 222.

When all cards 304 within a particular hand 302 have been posted, the value of the cash award displayed in award meter 306 of the hand 302 is typically distributed to gaming machines 222 proportionately to the number of postings achieved by each gaming machine 222. In the aspect of the embodiment in which a feature event meter 308 is provided, the value of the cash award displayed therein may also be distributed to the competing players according to a variety of payout schemes, including proportionate distribution according to the number of posted outcomes, equal distribution, random distribution, weighted distribution (e.g., higher returns to gaming machines 222 achieving two or more consecutive postings in a winning hand 302, etc.). According to one exemplary method of competitive play on gaming machines 222, the opportunity to achieve a specific outcome which will post a card 304 occurs whenever a game outcome on a particular gaming machine 222 results in "two pair" (i.e., any two cards 304 of the same denomination in addition to any other two cards 304 of the same denomination) or "four of a kind" (i.e., four cards 304 of the same denomination). In this situation, the gaming machine 222 achieving one of the subject outcomes examines the fifth card 304*a* to determine whether that card 304 is one which is displayed on event display device 224 (and/or a video screen window of gaming machines 222). If that card 304*a* is one which is displayed and no other specific outcome of any gaming machine 222 has resulted in the posting of that card 304*a*, then the card 304*a* is posted with the designator 310 of the particular gaming machine 222 which achieved the subject specific outcome.

Still referring to FIG. 14, a gaming machine 222*a* provided with the designator 310 of "1," is illustrated as having a final game outcome 312 of four "Twos" and a King. Since the four "Twos" constitute "four of a kind," one of the two outcomes is specified by the particular nonlimiting embodiment, the fifth card (i.e., the King) is examined to determine if it is displayed on event display device 224 in an unposted state. In the illustrated embodiment, no cards 304 had been previously posted. Accordingly, a "1," representing the designator 310 of gaming machine 222*a* is posted on event display device 224 on a card 304 (i.e., the King) having the same denomination and suit as the King displayed in the game outcome 312 of gaming machine 222*a.*

In addition to receiving the designator 310, the card 304 optionally may be "crowned" (i.e., provided with a crown 314), or provided with some other highly visible designation of a posting, as is shown in FIG. 14. In a related aspect of the embodiment, designators 310 may be displayed on a prominent area of the crown 314, such as on a large central jewel thereof. With further reference to FIG. 14, a header 316 labeling the embodiment is displayed on event display device 224. In the illustrated embodiment, the header 316 conveys the wording "A Part of Royalty," making reference to the high value of the cards 304 displayed on event display device 224 in this style of a video poker-type game.

Figure 15:
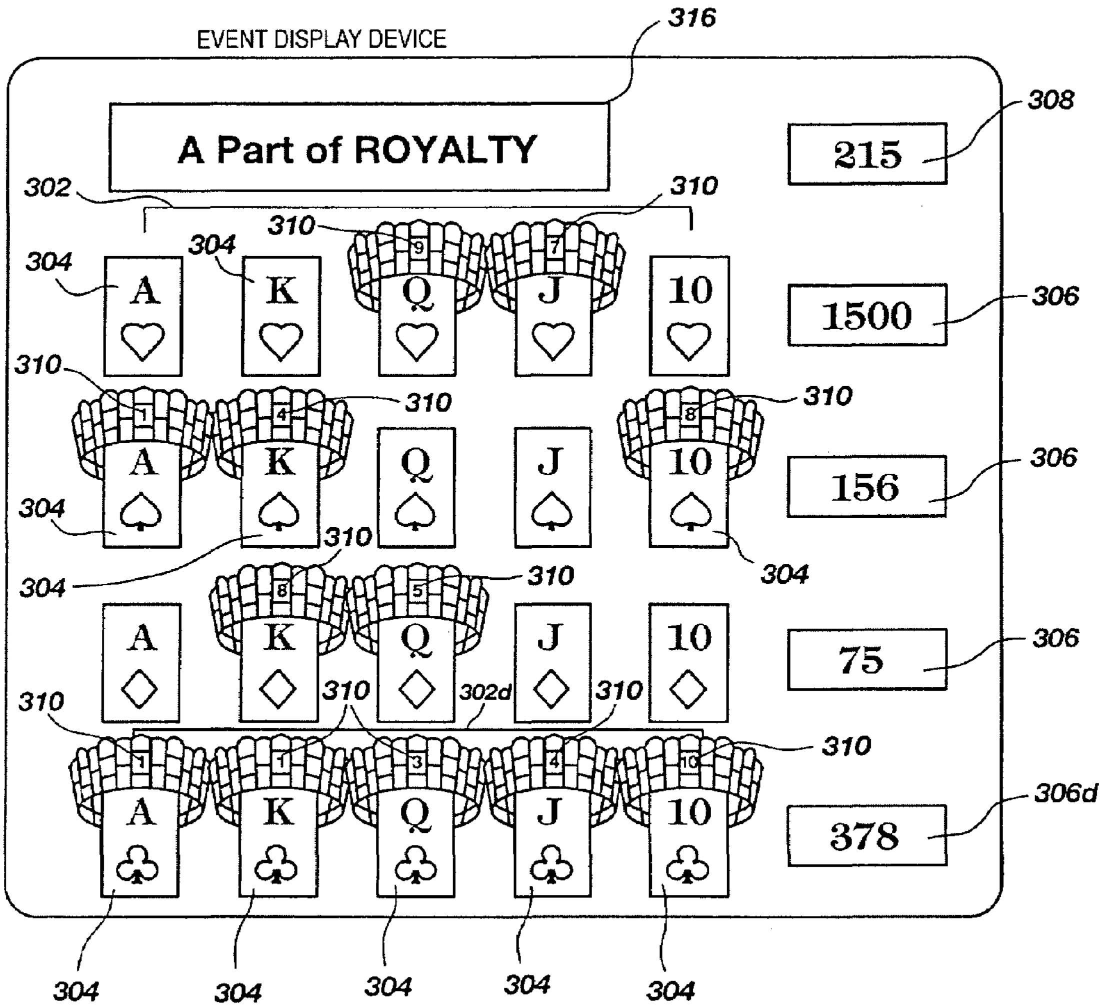

Referring now to drawing FIG. 15, the above-described process continues until all five cards 304 in any hand 302 are provided with a designator 310. As shown in FIG. 15, the cards 304 of the bottom-most hand 302*d* (the winning hand) of the four hands 302 have been "crowned" and respectively provided with designators 310 of "1, " "1," "3,"0 "4," and "10." The identified designators 310 represent various gaming machines 222 competing in the subject embodiment and which have achieved "winning" specific outcomes in the manner described above. Other hands 302 are shown with less than all cards 304 posted with designators 310. In a preferred aspect of the embodiment, more than one designator 310 may provided on a single card 304 when more than one specific outcome for posting a card 304 has been achieved by gaming machines 222. In a currently preferred alternate aspect of the embodiment, a previously posted designator 310 on a particular card 304 may be replaced by another designator 310 resulting from one or more subsequently occurring specific outcomes with respect to that card 304.

FIG. 15 further shows an award meter 306*d* associated with bottom-most hand 302*d* In a preferred aspect of the embodiment, the cash value displayed on award meter 306*d* is distributed proportionately to gaming machines 222 according to the number of designators 310 on cards 304 in bottom-most hand 302*d*. In a second preferred aspect of the embodiment, the entire prize value of feature event meter 308 is awarded to the player on gaming machines 222 who achieves the specific outcome which posts the last of the five cards 304 of a hand 302. In another preferred aspect of the embodiment, the cash value displayed on award meter 306*d* is distributed proportionately to gaming machines 222 according to the number of designators 310 on cards 304 in bottom-most hand 302*d* and the entire prize value of feature event meter 308 is awarded to the player on gaming machine 222 who achieves the specific outcome which posts the last of the five cards 304 of a hand 302. Of course, cash awards or other prizes may also or alternatively be distributed according to other payment schemes, such as those discussed previously herein in relation to FIGS. 9 through 12.

Following the distribution of the subject awards or other prizes to gaming machines 222, the four hands of cards 302 are "reset" (i.e., crowns 314 and designators 310 are removed from cards 304 and prize values are provided in award meters 306 and feature event meter 308). Competitive play then continues according to the embodiment as previously described.

When a player leaves a participating gaming machine 222 before the above-described video poker feature event is over, cards 304 which have been posted to the gaming machine 222 of the leaving player may be, for example: left attributed to the subject gaming machine 222 for the next player; used to increase the prize value displayed in feature event meter 308 if there has not been play (no credits in gaming machine 222) for a predetermined period of time; not paid and/or cleared if there has been no play (no credits in gaming machine 222) for a predetermined period of time; awarded to another gaming machine 222 (e.g., the gaming machine 222 that posted the last available card 304 on a winning hand 302); or released (e.g., changed to unposted) during or after play if a gaming machine 222 has not been used for a certain time period.

Each of the embodiments of the present invention may also be easily adapted for play on individual gaming machines rather than for competitive play. It is specifically contemplated that the immediately preceding embodiment described herein, which may be termed "A Part of Royalty," may be particularly suitable for play as a stand-alone game on an individual gaming machine.

Figure 16:
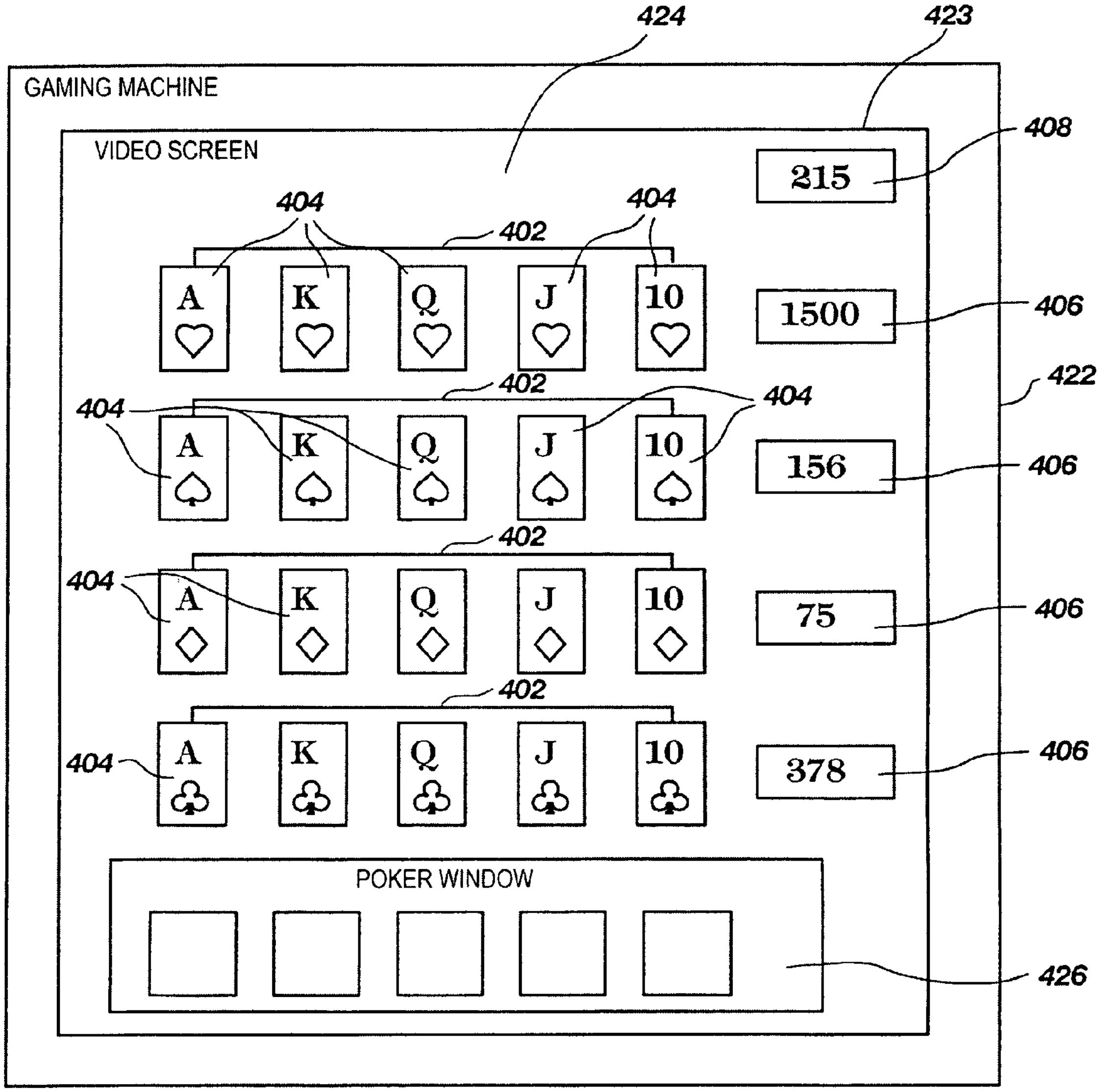
Figure 17:
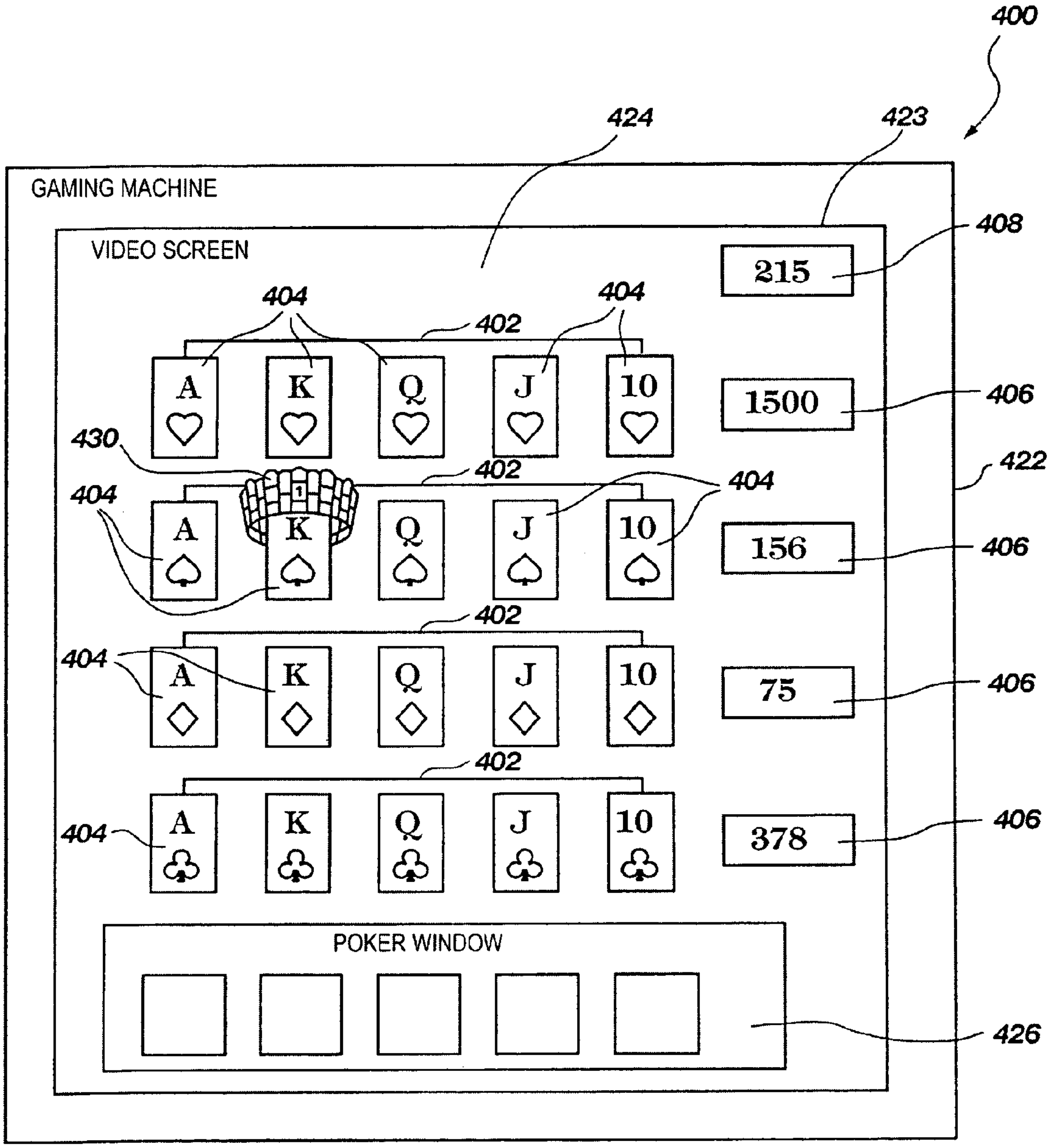
FIGS. 17 through 18 illustrate a draw poker embodiment of a feature event game of chance playable by a single player.
Figure 18:
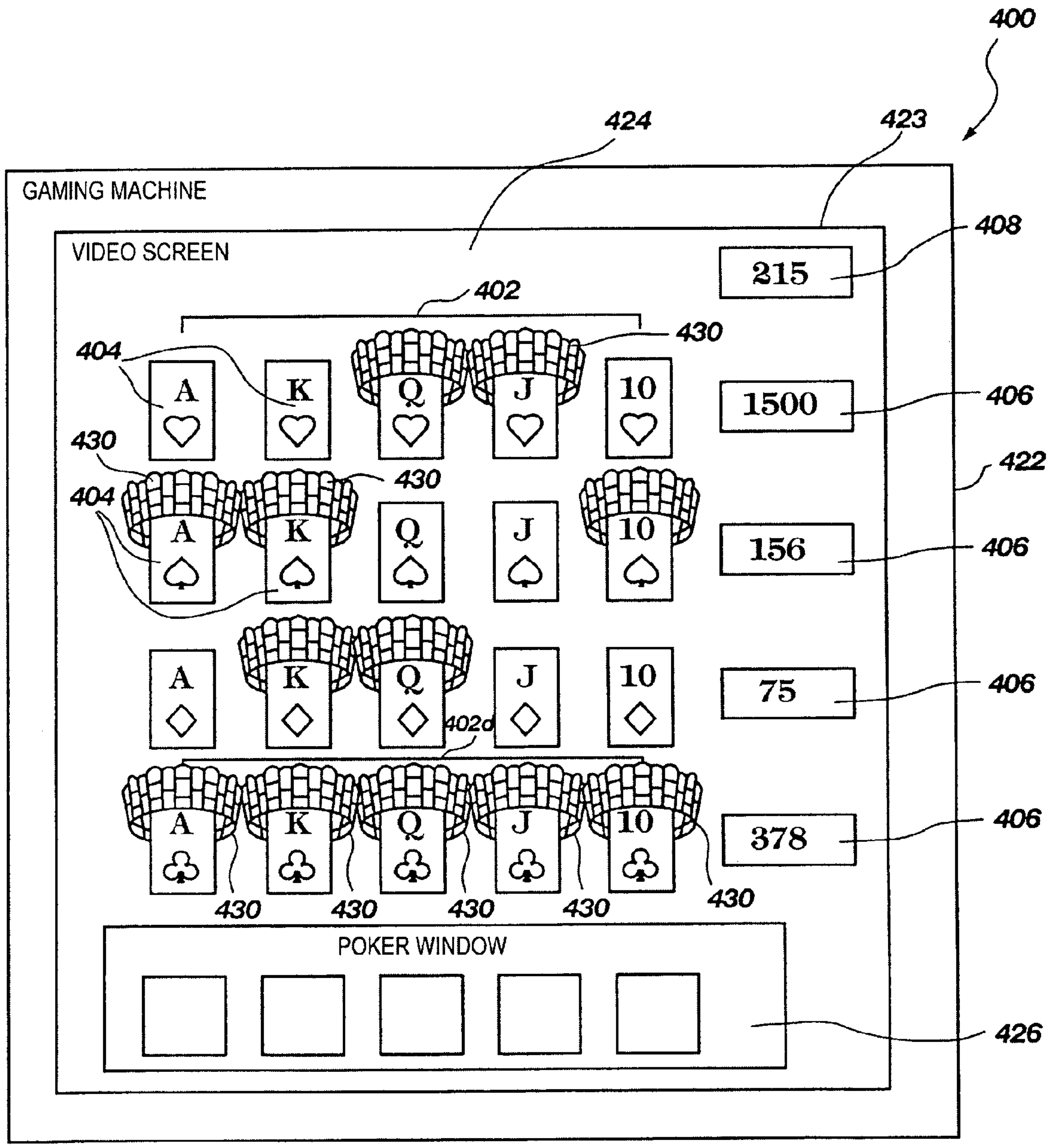

As a further nonlimiting example of the game of the present invention, a method of play is described in relation to a video poker game configuration 400 shown in drawing FIGS. 16 through 18. In FIG. 16, four possible hands 402 of cards 404 are displayed in rows on a game board window 424 of a video screen 423 of a gaming machine 422 configured for the play of draw poker. As previously described in regard to FIG. 13, each hand 402 comprises a "Royal Flush" in a differing card suit of the four conventionally known card suits.

Associated with each hand 402 is an award meter 406 displaying a cash award. The cash award displayed by each award meter 406 may be the same or different for each hand 402. For purposes of illustrating the scope of the present invention, award meters 406 are configured as "progressive" meters which are tied to a bank (or other configuration) of interconnected gaming machines of the same of differing types. As used herein, the term "progressive" refers to a prize amount, normally starting at a minimum value, which is increased by holding back a small percentage of each wager of the interconnected gaming machines. In an alternate embodiment, gaming machine 422 may be configured with its own internal progressive displayed on award meters 406. Of course, the subject embodiment is not intended to be limiting, and award meters 406 may be configured as any of a variety of payout-providing award meters known in the art.

In a further aspect of the embodiment, a game board meter 408 is disposed over hands 402 on a upper portion of a video screen 423 of gaming machines 422. Game board meter 408 also displays a cash award prize which may be a fixed amount, a variable amount (e.g., the amount may vary randomly or otherwise between games played on gaming machine 422), a progressive, or the like.

A draw poker game is displayed and configured to be played in a poker window 426 on video screen 423. To win the progressive amount displayed in an award meter 406 and game board meter 408, all cards 404 of a particular hand 402 must be earmarked or posted as a result of specific outcomes on gaming machine 422. In one exemplary embodiment of the present invention, specific outcomes associated with a particular card 404 cause that card 404 to be crowned, as was previously described in relation to FIGS. 14 and 15.

As one example illustrative of a method of play, a player wagers on and plays a conventional game of draw poker on poker window 426 of gaming machine 422. Preferably, poker window 426 and game board window 424 are displayable simultaneously on video screen 423 of gaming machine 422. Alternatively, a separate screen may be provided for one of poker window 426 and game board window 424. Briefly, the opportunity to achieve a specific outcome which will earmark or post a card 404 occurs, as one example, whenever a game outcome on poker window 426 results in "two pair" or "four of a kind." When this takes place, gaming machine 422 examines the fifth card 404 to determine whether that card 404 is one which is displayed on game board window 424 of gaming machine 422. If that card 404 is one which is displayed and no other specific outcome of gaming machine 422 has resulted in the posting of that card 404, then the card 404 is "crowned" on game board window 424 by, for example, a video representation of a jeweled crown 430 being placed over a portion of that card 404 (drawing FIG. 17).

In a preferred aspect of the embodiment, a percentage of each wager made on gaming machine 422 is allocated to the feature event among award meters 406 and game board meter 408. For example, five percent of a wager may be allocated to the feature event, one percent (of the five) being added to the value displayed on game board meter 408 while one percent (of the five) may be added to the amount displayed in each award meter 406. Only rounded whole number portions of wagers are displayed and available to be won.

A player continues to wager and play on gaming machine 422 until all five cards 404 of a given hand 402 are crowned. A winning hand 402 is shown in the lowermost row of cards in drawing FIG. 18. When all five cards 404 of a hand 402 are crowned, the player is awarded the value of the award meter 406 associated with the winning hand 402 plus the value of the game board meter 408. As previously discussed, award meters 406 may be linked to other gaming machines for purposes of updating and determining a progressive award associated therewith. After the awards are distributed, award meter 406 for the game which has been completed (all five cards of hand 402*d* being crowned) and game board meter 408 are reset to zero (or a predetermined or randomized startup value), and the five cards 404 in winning hand 402*a* are "uncrowned." The award meters 406 for the remaining three hands 402 are left to continue to build with further play.

In a further aspect of the embodiment and as noted above, crowns 430 on cards 404 on hands 402 other than winning hand 402*d* may remain until such time as their associated hands 402 are completed, or may be cleared for the next round of play.

While the embodiments of the present invention described thus far have employed a plurality of cells arranged in at least one group configured as a row, column or otherwise arranged linearly, the present invention and display thereof is not so limited. For example, a plurality of cells configured for display as clouds may be randomly placed in one or more groups on a display device linked to a plurality of gaming machines or to an individual gaming machine. In this embodiment of the present invention, the game of chance may be termed "Cloud Burst" for the sake of convenience. Each specific outcome on a gaming machine linked to the display device may result in a cloud being earmarked. When all the clouds on the display (or on a selected group when multiple groups of clouds are employed) are earmarked, the game of chance is configured to "rain" awards to each gaming machine having an earmarked cloud, the rain being accompanied, as desired, with suitable video and audio accompaniments in the form of lightning and thunder. Thus, those of ordinary skill in the art will understand and appreciate that the grouping or groupings of cells may be arranged and depicted in many different formats in accordance with the present invention.

It is further specifically contemplated that a single award meter may be employed, rather than one for each award category (ladder, lane, hand, etc.). Thus, a single meter may have its value increased at each time any cell in any award category is assigned or hit. When an award category is completed, all the cells thereof having been assigned or hit, the payout value indicated on the single award meter which has accumulated from hits on cells in different categories during the course of play may be distributed among the gaming machines "owning" cells within the completed award category.

Once apprized of the principles of the present invention, many variations of the above-described embodiments of feature event games of chance will become apparent to one skilled in the art. For example, competing players may receive payouts for all or some winning outcomes on their respective gaming machines in addition to competing for postings and winnings associated with a feature event game of chance. In addition, the principles of the present invention may be readily implemented on the Internet and other computer data networks known in the art.

Although the present invention has been shown and described with respect to preferred embodiments, various additions, deletions and modifications that are obvious to a person skilled in the art to which the invention pertains, even if not shown or specifically described herein, are deemed to lie within the scope of the invention as encompassed by the following claims.

What is claimed is:

1. A method of facilitating play of a group game, comprising:

in each of a plurality of plays of individual games played by a plurality of players at respective gaming machines, generating an outcome for the individual game, the outcome being one of a plurality of outcomes including at least a first set of outcomes and a second set of outcomes;

displaying a first group of cells and an associated first value payout, each cell in the first group of cells capable of being designated with a designator in response to any player of the plurality of players achieving one of the outcomes in the first set of outcomes, wherein the designator indicates the gaming machine at which said one of the outcomes in the first set of outcomes was generated;

designating a corresponding cell of the first group of cells with the designator responsive to an occurrence of any outcome from the first set of outcomes if the outcome generated for the individual game is from the first set of outcomes;

displaying a second group of cells and an associated second different value payout while displaying the first group of cells and the associated first value payout, each cell in the second group of cells capable of being designated with the designator in response to any player of the plurality of players achieving one of the outcomes in the second set of outcomes, wherein the designator indicates the gaming machine at which said one of the outcomes in the second set of outcomes was generated the second group of cells being non-overlapping with the first group of cells;

designating a cell of the second group of cells with the designator responsive to an occurrence of any outcome from the second set of outcomes if the outcome generated for the individual game is from the second set of outcomes; and providing the first value payout if each of the cells in the first group of cells is designated; and providing the second different value payout if each of the cells in the second group of cells is designated, wherein the first value payout is associated with only the first group of cells and is displayed in association with only the first group of cells and the second different value payout is associated with only the second group of cells and is displayed in association with only the second group of cells; and apportioning at least one of the first value payout among a first plurality of players or the second value payout among a second plurality of players, wherein apportioning the first value payout or the second value payout comprises apportioning based on the number of designations of each gaming machine in the designated cells of the corresponding first group of cells or the second group of cells.

2. The method of claim 1, further comprising apportioning the first value payout among a first plurality of players if all of the cells in the first group of cells are designated; and apportioning the second value payout among a second plurality of players if all of the cells in the second group of cells are designated.

3. The method of claim 1, further comprising distributing the first value payout to the first plurality of players.

4. The method of claim 1, wherein the first group of cells comprises a first row of cells and the second group of cells comprises a second row of cells.

5. The method of claims 1, wherein the first group of cells comprises a first column of cells and the second group of cells comprises a second column of cells.

6. The method of claim 1, further comprising configuring the first group of cells as a group of playing card indicia and providing a playing card indicia of the group of playing card indicia for each cell of the first group of cells.

7. The method of claim 1, wherein the individual game comprises draw poker.

8. The method of claim 1, wherein displaying the first group of cells comprises displaying a first group of playing card indicia having a first suit, and where displaying the second group of cells comprises displaying a second group of playing card indicia having a second suit.

9. The method of claim 8, wherein each of the first playing card indicia and the second playing card indicia comprises a hand including a Royal Flush.

10. The method of claim 9, wherein designating the corresponding cell of the first group of cells comprises designating a playing card indicia.

11. The method of claim 10, wherein designating the playing card indicia comprises crowning the playing card indicia.

12. A group gaming method, comprising:

receiving wagers from a plurality of players at respective gaming machines;

determining outcomes of individual games played by the plurality of players at the respective gaming machines;

displaying an image representative of a group game played by the plurality of players at the respective gaming machines, wherein the image representative of the group game comprises a first plurality of cells and a first value payout corresponding to a first group goal and a second plurality of cells and a second different value payout corresponding to a second group goal, wherein each cell of the first plurality of cells and the second plurality of cells is attributable to any of the respective gaming machines of the plurality of players and the second group of cells is non-overlapping with the first group of cells;

for each outcome from a first set of outcomes, designating a cell of the first plurality of cells with a designation indicative of the respective gaming machine at which the outcome from the first set of outcomes was determined;

for each outcome from a second set of outcomes, designating a cell of the second plurality of cells with a designation indicative of the respective gaming machine at which the outcome from the second set of outcomes was determined;

providing the first value payout if the first group goal is achieved through the designation of each of the first plurality of cells, the first value payout associated with only the first plurality of cells;

providing the second different value payout if the second group goal is achieved through the designation of each of the second plurality of cells, the second value payout associated with only the second plurality of cells; and displaying the first value payout in association with only the first group of cells and displaying the second different value payout in association with only the second group of cells, wherein each cell is capable of being designated to multiple gaming machines.

13. A group gaming method according to claim 12, wherein the first group goal includes achieving a predetermined number of outcomes from the first set of outcomes.

14. A group gaming method according to claim 13, wherein a number of designated cells of the first plurality of cells corresponds to a number of outcomes from the first set of outcomes achieved by the plurality of players.

15. A group gaming method according to claim 14, wherein the first plurality of cells is arranged in an order;

wherein designating the cell of the first plurality of cells comprises designating a next cell in the order.

16. A group gaming method according to claim 15, wherein the image representative of the group game includes a ladder, the ladder comprising the first plurality of cells, the ladder having a bottom and a top;

wherein designating the cell from the first plurality of cells comprises designating the next undesignated cell from the bottom of the ladder.

17. A group gaming method according to claim 16, further comprising:

if the next undesignated cell is designated, displaying an image of a figure on the ladder moving toward the top by one cell.

18. A group gaming method according to claim 15, wherein the image representative of the group game includes a lane, the lane comprising the first plurality of cells, the lane having a beginning and an end;

wherein designating the cell from the first plurality of cells comprises designating the next undesignated cell from the beginning of the lane.

19. A group gaming method according to claim 18, further comprising:

if the next undesignated cell is designated, displaying an image of an object on the lane moving toward the end by one cell.

20. A group gaming method according to claim 19, wherein the object on the lane is a car.

21. A group gaming method according to claim 12, wherein each cell of the first plurality of cells corresponds to at least one outcome from the first set of outcomes.

22. A group gaming method according to claim 21, wherein the achieving the first group goal corresponds to designating all of the cells in the first plurality of cells.

23. A group gaming method according to claim 22, wherein designating the cell of the first plurality of cells comprises removing a previous designation, if any.

24. A group gaming method according to claim 22, wherein designating the cell of the first plurality of cells comprises not designating the cell if the cell was previously designated.

25. A group gaming method according to claim 22, wherein the image representative of the group game includes a plurality of playing cards, wherein each playing card of the plurality of playing cards comprises a respective cell of the first plurality of cells;

wherein designating the cell from the first plurality of cells comprises designating a playing card from the plurality of playing cards.

26. A group gaming method according to claim 25, wherein designating the playing card comprises displaying a crown on the playing card.

27. A group gaming method according to claim 12, wherein providing the first value payout comprises providing the first value payout when all of the cells of the first plurality of cells have been designated.

28. A group gaming method according to claim 27, wherein providing the first value payout comprises apportioning the first value payout among players whose gaming machine corresponds to at least one of the designated cells in the first plurality of cells.

29. A group gaming method according to claim 28, wherein the first value payout is apportioned based on the numbers of designated cells in the first plurality of cells corresponding to each gaming machine.

30. A group gaming method according to claim 29, wherein each cell of the first plurality of cells corresponds to a portion of the first value payout;

wherein apportioning the first value payout comprises apportioning each portion of the first value payout to players whose gaming machines correspond to the designated cell in the first plurality of cells associated with the portion of the first value payout.

31. A group gaming method according to claim 30, wherein each cell of the first plurality of cells is capable of being attributed to a single player multiple times;

wherein apportioning each portion of the first value payout is based on the number of designations for each gaming machine corresponding to the designated cell associated with the portion of the first value payout.

32. A group gaming method according to claim 12, further comprising displaying an image representative of an individual game played by one of the plurality of players.

33. A group gaming method according to claim 12, wherein the first individual game comprises at least one of a reel-type slot machine game, a poker game, a blackjack game, a keno game, a lotto game, and a bingo game.

34. A group gaming system comprising:

a plurality of gaming machines, each gaming machine of the plurality of gaming machines comprising:

a gaming machine controller comprising a processor and a memory operatively coupled to the processor, the gaming machine controller configured to:

(a) receive a respective wager from a respective player;

(b) display a respective image representative of a respective individual game played by the respective player;

(c) determine a respective outcome of the respective individual game, the respective outcome of the respective individual game from a plurality of possible outcomes; and (d) provide at least a portion of a value payout associated with a group game;

a display device communicatively coupled to the plurality of gaming machines, the display device comprising a display screen operatively coupled to a display device processor, the display device processor configured to:

(i) display an image representative of the group game played by a plurality of players at the respective gaming machines, wherein the image representative of the group game comprises a first plurality of cells and a first value payout corresponding to a first group goal and a second plurality of cells and a second different value payout corresponding to a second group goal, wherein each cell of the first plurality of cells and the second plurality of cells is attributable to any of the respective gaming machines of the plurality of players and the second plurality of cells is non-overlapping with the first plurality of cells, wherein the first value payout is associated with achieving the first group goal through designation of each of the first plurality of cells and is associated with only and displayed with only the first plurality of cells, and wherein the second different value payout is associated with achieving the second group goal through designation of each of the second plurality of cells and is associated with only and displayed with only the second plurality of cells;

(ii) for each outcome from a first set of outcomes, designate a cell of the first plurality of cells with a designation indicative of the respective gaming machine at which the outcome from the first set of outcomes was determined, wherein each cell of the first plurality of cells is capable of being designated to multiple gaming machines; and (iii) for each outcome from a second set of outcomes, designate a cell of the second plurality of cells with a designation indicative of the respective gaming machine at which the outcome from the second set of outcomes was determined, wherein each cell of the second plurality of cells is capable of being designated to multiple gaming machines.

* * * * *